US011997120B2

(12) United States Patent
Panse et al.

(10) Patent No.: US 11,997,120 B2
(45) Date of Patent: May 28, 2024

(54) DETECTING THREATS TO DATACENTER BASED ON ANALYSIS OF ANOMALOUS EVENTS

(71) Applicant: VMware LLC, Palo Alto, CA (US)

(72) Inventors: Tejas Sanjeev Panse, San Jose, CA (US); Aditi Vutukuri, Atlanta, GA (US); Arnold Koon-Chee Poon, San Mateo, CA (US); Rajiv Mordani, Fremont, CA (US); Margaret Petrus, San Jose, CA (US)

(73) Assignee: VMware LLC, Palo Alto, CA (US)

( * ) Notice: Subject to any disclaimer, the term of this patent is extended or adjusted under 35 U.S.C. 154(b) by 325 days.

(21) Appl. No.: 17/372,271

(22) Filed: Jul. 9, 2021

(65) Prior Publication Data
US 2023/0011957 A1 Jan. 12, 2023

(51) Int. Cl.
H04L 9/40 (2022.01)

(52) U.S. Cl.
CPC ...... H04L 63/1425 (2013.01); H04L 63/0263 (2013.01); H04L 63/1416 (2013.01); H04L 63/1466 (2013.01); H04L 63/20 (2013.01)

(58) Field of Classification Search
CPC ............. H04L 63/1425; H04L 63/0263; H04L 63/1416; H04L 63/1466; H04L 63/20
See application file for complete search history.

(56) References Cited

U.S. PATENT DOCUMENTS

| 5,636,128 | A | 6/1997 | Sugimoto et al. |
| 7,027,411 | B1 | 4/2006 | Pulsipher et al. |
| 7,065,079 | B1 | 6/2006 | Patra et al. |
| 7,352,280 | B1* | 4/2008 | Rockwood ............ G06F 21/55 340/521 |
| 7,580,356 | B1 | 8/2009 | Mishra et al. |
| 7,739,211 | B2 | 6/2010 | Coffman et al. |
| 7,908,655 | B1 | 3/2011 | Bhattacharyya et al. |
| 8,005,945 | B2 | 8/2011 | Cohen et al. |
| 8,125,898 | B1* | 2/2012 | Strayer ............... H04L 63/1416 709/224 |

(Continued)

FOREIGN PATENT DOCUMENTS

| EP | 3716075 A1 | 9/2020 |
| EP | 3767553 A1 | 1/2021 |
| WO | 2006091175 A1 | 8/2006 |
| WO | 2016003262 A1 | 1/2016 |

OTHER PUBLICATIONS

Abbes, Tarek, et al., "Detection of Firewall Configuration Errors with Updatable Tree," International Journal of Information Security, May 2015, 17 pages, vol. 15, No. 3, Springer Verlag.

(Continued)

Primary Examiner — Aravind K Moorthy
(74) Attorney, Agent, or Firm — Quarles & Brady LLP

(57) ABSTRACT

Some embodiments provide a method for detecting a threat to a datacenter. The method receives a set of connections between a set of DCNs in the datacenter over a particular time period. The set of DCNs includes at least a first DCN at which a first anomalous event was detected. The method analyzes a set of detected anomalous events to identify additional anomalous events detected at other DCNs in the set of DCNs during the particular time period. Based on the first anomalous event and identified additional anomalous events, the method determines whether the anomalous events indicate a threat to the datacenter.

20 Claims, 11 Drawing Sheets

(56) References Cited

U.S. PATENT DOCUMENTS

| | | | |
|---|---|---|---|
| 8,359,652 B2 | 1/2013 | Bhagwan et al. |
| 8,495,429 B2 | 7/2013 | Fu et al. |
| 8,499,348 B1* | 7/2013 | Rubin | H04L 63/20 |
| | | | 726/25 |
| 8,605,655 B1 | 12/2013 | Sahai et al. |
| 8,762,957 B2 | 6/2014 | Cobb et al. |
| 9,166,997 B1* | 10/2015 | Guo | G06F 21/554 |
| 9,215,213 B2 | 12/2015 | Bansal et al. |
| 9,218,527 B2 | 12/2015 | Lakshminarayan et al. |
| 9,223,683 B1* | 12/2015 | Knych | G06F 11/3684 |
| 9,223,767 B1 | 12/2015 | Powell et al. |
| 9,325,732 B1* | 4/2016 | Stickle | H04L 63/1408 |
| 9,438,560 B2 | 9/2016 | Mohanty et al. |
| 9,438,634 B1 | 9/2016 | Ross et al. |
| 9,454,444 B1 | 9/2016 | Agarwal et al. |
| 9,467,476 B1 | 10/2016 | Shieh et al. |
| 9,497,206 B2 | 11/2016 | Bernstein et al. |
| 9,578,050 B1 | 2/2017 | Barabash et al. |
| 9,680,877 B2 | 6/2017 | Duffield et al. |
| 9,699,049 B2 | 7/2017 | Gupta et al. |
| 9,767,197 B1 | 9/2017 | Agarwal et al. |
| 9,787,641 B2 | 10/2017 | Bansal et al. |
| 9,792,447 B2 | 10/2017 | Thota et al. |
| 9,882,713 B1 | 1/2018 | Raza et al. |
| 9,891,940 B2 | 2/2018 | Feroz et al. |
| 9,998,339 B1 | 6/2018 | Brajkovic et al. |
| 10,129,162 B1 | 11/2018 | Faulk, Jr. |
| 10,129,276 B1* | 11/2018 | Raviv | H04L 63/1441 |
| 10,218,717 B1* | 2/2019 | Amidon | H04L 63/20 |
| 10,242,202 B1* | 3/2019 | Erickson | G06F 21/56 |
| 10,248,533 B1* | 4/2019 | Shah | G06F 11/3006 |
| 10,257,227 B1 | 4/2019 | Stickle et al. |
| 10,262,133 B1* | 4/2019 | Cohen | G06F 21/554 |
| 10,298,505 B1 | 5/2019 | Grant et al. |
| 10,298,619 B2 | 5/2019 | Nimmagadda et al. |
| 10,324,746 B2 | 6/2019 | Kumar et al. |
| 10,419,321 B2 | 9/2019 | Raman et al. |
| 10,425,437 B1 | 9/2019 | Bog et al. |
| 10,432,707 B2 | 10/2019 | Hosie et al. |
| 10,521,584 B1* | 12/2019 | Sharifi Mehr | H04L 63/1433 |
| 10,581,897 B1* | 3/2020 | Natanzon | G06F 11/0754 |
| 10,735,282 B1 | 8/2020 | Singh et al. |
| 10,812,409 B2 | 10/2020 | Tiwary et al. |
| 10,873,592 B1* | 12/2020 | Singh | H04L 67/535 |
| 10,887,337 B1* | 1/2021 | Kim | H04L 63/1433 |
| 10,911,335 B1 | 2/2021 | Mordani et al. |
| 11,140,090 B2 | 10/2021 | Mordani et al. |
| 11,150,976 B1* | 10/2021 | Marwah | G06F 11/0793 |
| 11,176,157 B2 | 11/2021 | Mordani et al. |
| 11,188,570 B2 | 11/2021 | Jain et al. |
| 11,269,718 B1* | 3/2022 | Chen | G06F 11/079 |
| 11,288,256 B2 | 3/2022 | Jain et al. |
| 11,296,960 B2 | 4/2022 | Wang et al. |
| 11,321,213 B2 | 5/2022 | Gunda et al. |
| 11,340,931 B2 | 5/2022 | Krishna et al. |
| 11,343,262 B2 | 5/2022 | Junod et al. |
| 11,347,896 B1 | 5/2022 | Brown, Jr. et al. |
| 11,349,876 B2 | 5/2022 | Krishna et al. |
| 11,374,952 B1* | 6/2022 | Coskun | G06N 3/045 |
| 11,374,968 B1* | 6/2022 | Colón | H04L 63/1466 |
| 11,398,987 B2 | 7/2022 | Jain et al. |
| 11,425,150 B1* | 8/2022 | Emanuel | G06N 20/00 |
| 11,425,157 B2* | 8/2022 | Tan | G06F 16/2455 |
| 11,436,075 B2 | 9/2022 | Jain et al. |
| 11,593,639 B1* | 2/2023 | Garg | G06F 18/2415 |
| 11,770,387 B1* | 9/2023 | Shivamoggi | H04L 63/1433 |
| | | | 726/23 |
| 2003/0120955 A1 | 6/2003 | Bartal et al. |
| 2003/0236677 A1 | 12/2003 | Casati et al. |
| 2004/0111469 A1* | 6/2004 | Manion | H04L 67/1089 |
| | | | 709/204 |
| 2004/0190724 A1 | 9/2004 | Dettinger et al. |
| 2005/0108444 A1 | 5/2005 | Flauaus et al. |
| 2005/0262554 A1 | 11/2005 | Brooks et al. |
| 2005/0289219 A1 | 12/2005 | Nazzal |
| 2006/0085785 A1 | 4/2006 | Garrett |
| 2006/0140127 A1* | 6/2006 | Lee | H04L 43/18 |
| | | | 370/389 |
| 2006/0168657 A1 | 7/2006 | Baentsch et al. |
| 2006/0174337 A1 | 8/2006 | Bernoth |
| 2006/0239203 A1 | 10/2006 | Talpade et al. |
| 2007/0011734 A1 | 1/2007 | Balakrishnan et al. |
| 2007/0016666 A1 | 1/2007 | Duffield et al. |
| 2007/0058632 A1 | 3/2007 | Back et al. |
| 2007/0209075 A1* | 9/2007 | Coffman | H04L 63/14 |
| | | | 709/224 |
| 2008/0037423 A1 | 2/2008 | Singh et al. |
| 2008/0059596 A1 | 3/2008 | Ogawa |
| 2008/0196102 A1 | 8/2008 | Roesch |
| 2008/0196103 A1 | 8/2008 | Lin et al. |
| 2008/0263661 A1* | 10/2008 | Bouzida | H04L 63/1416 |
| | | | 726/22 |
| 2008/0267186 A1 | 10/2008 | Boukis et al. |
| 2008/0281660 A1 | 11/2008 | Sajja et al. |
| 2008/0282335 A1 | 11/2008 | Abzarian et al. |
| 2009/0077663 A1 | 3/2009 | Sun et al. |
| 2009/0106228 A1 | 4/2009 | Weinman, Jr. |
| 2009/0300341 A1 | 12/2009 | Buehler et al. |
| 2010/0049968 A1 | 2/2010 | Dimitrakos et al. |
| 2010/0106764 A1 | 4/2010 | Chadwick et al. |
| 2010/0107085 A1 | 4/2010 | Chadwick et al. |
| 2010/0153316 A1 | 6/2010 | Duffield et al. |
| 2010/0211673 A1 | 8/2010 | Kosbab et al. |
| 2010/0241480 A1 | 9/2010 | Rokhlin et al. |
| 2010/0309812 A1 | 12/2010 | Marquez et al. |
| 2010/0325199 A1 | 12/2010 | Park et al. |
| 2010/0332262 A1 | 12/2010 | Horvitz et al. |
| 2011/0082962 A1 | 4/2011 | Horovitz et al. |
| 2011/0162039 A1 | 6/2011 | Trace et al. |
| 2011/0170413 A1 | 7/2011 | Shi et al. |
| 2012/0131591 A1 | 5/2012 | Moorthi et al. |
| 2012/0226808 A1 | 9/2012 | Morgan |
| 2012/0266231 A1 | 10/2012 | Spiers et al. |
| 2013/0041522 A1 | 2/2013 | Mori et al. |
| 2013/0067090 A1 | 3/2013 | Batrouni et al. |
| 2013/0085914 A1 | 4/2013 | Mcpherson et al. |
| 2013/0117567 A1 | 5/2013 | Chang et al. |
| 2013/0124753 A1 | 5/2013 | Ansari et al. |
| 2013/0185413 A1 | 7/2013 | Beaty et al. |
| 2013/0198459 A1 | 8/2013 | Joshi et al. |
| 2013/0212255 A1 | 8/2013 | Chao et al. |
| 2013/0227687 A1 | 8/2013 | Lee |
| 2013/0254766 A1 | 9/2013 | Zuo et al. |
| 2013/0297768 A1 | 11/2013 | Singh |
| 2013/0298184 A1* | 11/2013 | Ermagan | G06F 21/54 |
| | | | 726/1 |
| 2014/0019964 A1 | 1/2014 | Neuse et al. |
| 2014/0075564 A1* | 3/2014 | Singla | H04L 41/0894 |
| | | | 726/25 |
| 2014/0089506 A1 | 3/2014 | Naga et al. |
| 2014/0207918 A1 | 7/2014 | Kowalski et al. |
| 2014/0230008 A1 | 8/2014 | Feroz et al. |
| 2014/0245423 A1 | 8/2014 | Lee |
| 2014/0245443 A1* | 8/2014 | Chakraborty | H04L 63/1425 |
| | | | 726/23 |
| 2014/0282591 A1 | 9/2014 | Stich et al. |
| 2014/0310513 A1 | 10/2014 | Barney et al. |
| 2015/0047026 A1* | 2/2015 | Neil | H04L 63/1433 |
| | | | 726/22 |
| 2015/0113529 A1 | 4/2015 | Zhong |
| 2015/0124608 A1 | 5/2015 | Agarwal et al. |
| 2015/0135003 A1 | 5/2015 | Cota-Robles et al. |
| 2015/0156214 A1* | 6/2015 | Kaminsky | G06F 21/552 |
| | | | 726/22 |
| 2015/0180892 A1 | 6/2015 | Balderas |
| 2015/0181394 A1 | 6/2015 | Zuniga et al. |
| 2015/0207813 A1* | 7/2015 | Reybok | H04L 63/145 |
| | | | 726/22 |
| 2015/0281056 A1 | 10/2015 | Liljenstolpe |
| 2015/0281065 A1 | 10/2015 | Liljenstolpe |
| 2015/0286783 A1 | 10/2015 | Kumar et al. |
| 2015/0304349 A1 | 10/2015 | Bernstein et al. |

(56) References Cited

U.S. PATENT DOCUMENTS

| | | | |
|---|---|---|---|
| 2015/0355957 A1* | 12/2015 | Steiner | G06F 21/552 |
| | | | 714/37 |
| 2015/0358391 A1 | 12/2015 | Moon et al. | |
| 2016/0050589 A1 | 2/2016 | Safavi | |
| 2016/0080404 A1* | 3/2016 | Kohout | H04L 63/20 |
| | | | 726/23 |
| 2016/0087847 A1 | 3/2016 | Krithivas et al. | |
| 2016/0087859 A1 | 3/2016 | Kuan et al. | |
| 2016/0156591 A1 | 6/2016 | Zhou et al. | |
| 2016/0191413 A1 | 6/2016 | Feroz et al. | |
| 2016/0191463 A1 | 6/2016 | Mohanty et al. | |
| 2016/0191521 A1 | 6/2016 | Feroz et al. | |
| 2016/0216994 A1 | 7/2016 | Sefidcon et al. | |
| 2016/0218951 A1 | 7/2016 | Vasseur et al. | |
| 2016/0294800 A1 | 10/2016 | Oppenheim, Jr. et al. | |
| 2016/0294987 A1 | 10/2016 | Tian et al. | |
| 2016/0301603 A1 | 10/2016 | Park et al. | |
| 2016/0308898 A1* | 10/2016 | Teeple | H04L 63/1441 |
| 2016/0350683 A1 | 12/2016 | Bester et al. | |
| 2016/0352765 A1* | 12/2016 | Mermoud | H04L 63/1458 |
| 2016/0359759 A1 | 12/2016 | Singh et al. | |
| 2016/0380812 A1 | 12/2016 | Chanda et al. | |
| 2016/0380884 A1 | 12/2016 | Sarikaya et al. | |
| 2017/0005986 A1 | 1/2017 | Bansal et al. | |
| 2017/0078168 A1 | 3/2017 | Harris et al. | |
| 2017/0126677 A1 | 5/2017 | Kumar et al. | |
| 2017/0134247 A1 | 5/2017 | Hoja et al. | |
| 2017/0149804 A1* | 5/2017 | Kolbitsch | H04L 63/1416 |
| 2017/0149814 A1* | 5/2017 | Chen | H04L 41/142 |
| 2017/0207968 A1 | 7/2017 | Eicken et al. | |
| 2017/0212799 A1 | 7/2017 | Konireddygari | |
| 2017/0214634 A1 | 7/2017 | Li | |
| 2017/0223046 A1* | 8/2017 | Singh | H04L 63/1491 |
| 2017/0272452 A1* | 9/2017 | Kraemer | H04L 63/145 |
| 2017/0279687 A1 | 9/2017 | Muntés-Mulero et al. | |
| 2017/0288974 A1* | 10/2017 | Yoshihira | H04L 41/12 |
| 2017/0293994 A1 | 10/2017 | Li et al. | |
| 2017/0324632 A1 | 11/2017 | Arora | |
| 2017/0359217 A1 | 12/2017 | Ahuja et al. | |
| 2017/0374102 A1 | 12/2017 | Woolward | |
| 2017/0374106 A1 | 12/2017 | Hamou et al. | |
| 2018/0007005 A1* | 1/2018 | Chanda | H04L 63/0263 |
| 2018/0007127 A1 | 1/2018 | Salapura et al. | |
| 2018/0019932 A1* | 1/2018 | Giura | H04L 63/1425 |
| 2018/0027080 A1 | 1/2018 | Yang et al. | |
| 2018/0032399 A1 | 2/2018 | Johnson et al. | |
| 2018/0034856 A1 | 2/2018 | Mallya | |
| 2018/0041578 A1 | 2/2018 | Lee et al. | |
| 2018/0048623 A1 | 2/2018 | Bansal et al. | |
| 2018/0054456 A1* | 2/2018 | Ground | H04L 63/1433 |
| 2018/0063164 A1 | 3/2018 | Balasubramanian et al. | |
| 2018/0063178 A1* | 3/2018 | Jadhav | H04L 63/1433 |
| 2018/0077119 A1 | 3/2018 | Fields et al. | |
| 2018/0077120 A1 | 3/2018 | Baughman et al. | |
| 2018/0077189 A1 | 3/2018 | Doppke et al. | |
| 2018/0084034 A1 | 3/2018 | Netto et al. | |
| 2018/0088964 A1 | 3/2018 | Hussain et al. | |
| 2018/0091485 A1* | 3/2018 | Lee | H04W 12/041 |
| 2018/0101371 A1 | 4/2018 | Flanakin et al. | |
| 2018/0123907 A1 | 5/2018 | Raman et al. | |
| 2018/0123939 A1 | 5/2018 | Raman et al. | |
| 2018/0145999 A1 | 5/2018 | Ertugrul et al. | |
| 2018/0167405 A1 | 6/2018 | Comay et al. | |
| 2018/0176102 A1 | 6/2018 | Bansal et al. | |
| 2018/0176252 A1 | 6/2018 | Nimmagadda et al. | |
| 2018/0176261 A1 | 6/2018 | Bansal et al. | |
| 2018/0181423 A1 | 6/2018 | Gunda et al. | |
| 2018/0181754 A1 | 6/2018 | Gunda | |
| 2018/0183757 A1 | 6/2018 | Gunda et al. | |
| 2018/0183759 A1* | 6/2018 | Gunda | H04L 63/0254 |
| 2018/0183761 A1* | 6/2018 | Gunda | H04L 63/0263 |
| 2018/0189667 A1* | 7/2018 | Tsou | G06N 5/01 |
| 2018/0234333 A1 | 8/2018 | Inamdar et al. | |
| 2018/0270189 A1 | 9/2018 | Montenot et al. | |
| 2018/0270308 A1 | 9/2018 | Shea et al. | |
| 2018/0287876 A1 | 10/2018 | Strobel et al. | |
| 2018/0288063 A1 | 10/2018 | Koottayi et al. | |
| 2018/0295036 A1* | 10/2018 | Krishnamurthy | H04L 43/026 |
| 2018/0316704 A1 | 11/2018 | Durairaj et al. | |
| 2018/0324199 A1 | 11/2018 | Crotinger et al. | |
| 2018/0367548 A1* | 12/2018 | Stokes, III | H04L 63/1416 |
| 2019/0007292 A1 | 1/2019 | Nevo et al. | |
| 2019/0065739 A1* | 2/2019 | Manadhata | H04L 63/1425 |
| 2019/0065762 A1* | 2/2019 | Kim | H04L 63/108 |
| 2019/0075056 A1 | 3/2019 | Lu et al. | |
| 2019/0138423 A1* | 5/2019 | Agerstam | G06F 18/21 |
| 2019/0163900 A1 | 5/2019 | Zhang et al. | |
| 2019/0166008 A1 | 5/2019 | Gintis et al. | |
| 2019/0171474 A1 | 6/2019 | Malboubi et al. | |
| 2019/0180141 A1 | 6/2019 | Tiagi et al. | |
| 2019/0182276 A1 | 6/2019 | Tiagi et al. | |
| 2019/0182281 A1 | 6/2019 | Neil et al. | |
| 2019/0199599 A1 | 6/2019 | Zavesky et al. | |
| 2019/0260804 A1* | 8/2019 | Beck | G06F 16/2455 |
| 2019/0266004 A1 | 8/2019 | Kumar et al. | |
| 2019/0280949 A1 | 9/2019 | Wang et al. | |
| 2019/0294733 A1* | 9/2019 | Scheideler | G06F 16/9024 |
| 2019/0303562 A1 | 10/2019 | Masputra et al. | |
| 2019/0319863 A1 | 10/2019 | Gupta et al. | |
| 2019/0342335 A1 | 11/2019 | Ni et al. | |
| 2019/0373052 A1 | 12/2019 | Pollitt et al. | |
| 2019/0379612 A1 | 12/2019 | Tiwary et al. | |
| 2019/0392329 A1 | 12/2019 | Rangarajan et al. | |
| 2020/0028756 A1 | 1/2020 | Hale et al. | |
| 2020/0084087 A1 | 3/2020 | Sharma et al. | |
| 2020/0099708 A1* | 3/2020 | Mathews | H04L 41/145 |
| 2020/0100145 A1 | 3/2020 | Enqvist et al. | |
| 2020/0120109 A1* | 4/2020 | Shu | H04L 63/20 |
| 2020/0120118 A1* | 4/2020 | Shu | G06F 21/54 |
| 2020/0128043 A1* | 4/2020 | Xie | H04L 63/1466 |
| 2020/0128047 A1* | 4/2020 | Biswas | H04L 63/1425 |
| 2020/0159920 A1* | 5/2020 | Lin | G06F 21/562 |
| 2020/0162407 A1 | 5/2020 | Tillotson | |
| 2020/0167784 A1 | 5/2020 | Kursun | |
| 2020/0183947 A1 | 6/2020 | Reeve et al. | |
| 2020/0193031 A1* | 6/2020 | Avraham | G06F 21/566 |
| 2020/0210260 A1 | 7/2020 | Prabhakar et al. | |
| 2020/0220892 A1* | 7/2020 | Gibson | H04L 63/1441 |
| 2020/0244676 A1 | 7/2020 | Amit et al. | |
| 2020/0252461 A1* | 8/2020 | Xu | G16Y 20/20 |
| 2020/0310884 A1 | 10/2020 | Villalobos et al. | |
| 2020/0389477 A1* | 12/2020 | Ambrosi | H04L 41/069 |
| 2020/0396075 A1 | 12/2020 | Visegrady et al. | |
| 2020/0396254 A1 | 12/2020 | Crabtree et al. | |
| 2021/0006642 A1 | 1/2021 | He et al. | |
| 2021/0026677 A1 | 1/2021 | Krishna et al. | |
| 2021/0026720 A1 | 1/2021 | Jain et al. | |
| 2021/0026830 A1 | 1/2021 | Jain et al. | |
| 2021/0026863 A1 | 1/2021 | Mordani et al. | |
| 2021/0026870 A1 | 1/2021 | Jain et al. | |
| 2021/0028996 A1 | 1/2021 | Mordani et al. | |
| 2021/0029002 A1 | 1/2021 | Mordani et al. | |
| 2021/0029050 A1 | 1/2021 | Jain et al. | |
| 2021/0029051 A1 | 1/2021 | Mordani et al. | |
| 2021/0029166 A1 | 1/2021 | Krishna et al. | |
| 2021/0075789 A1 | 3/2021 | Wen et al. | |
| 2021/0084074 A1 | 3/2021 | Kirner et al. | |
| 2021/0092140 A1* | 3/2021 | Kazerounian | H04L 63/1425 |
| 2021/0099473 A1 | 4/2021 | Fainberg et al. | |
| 2021/0110282 A1* | 4/2021 | McCann | H04L 63/1416 |
| 2021/0110407 A1 | 4/2021 | Albero et al. | |
| 2021/0136101 A1* | 5/2021 | Ben-Yosef | H04L 63/1433 |
| 2021/0185073 A1 | 6/2021 | Ewaida et al. | |
| 2021/0185085 A1* | 6/2021 | Wang | H04L 63/1425 |
| 2021/0203684 A1* | 7/2021 | Maor | G06F 21/6218 |
| 2021/0218770 A1* | 7/2021 | Ben-Yosef | G06F 21/554 |
| 2021/0219219 A1* | 7/2021 | Sundararaj | H04W 48/18 |
| 2021/0224179 A1 | 7/2021 | Gunda et al. | |
| 2021/0243212 A1* | 8/2021 | Bowman | G06N 7/01 |
| 2021/0248240 A1* | 8/2021 | Comish | G06F 21/577 |
| 2021/0264025 A1* | 8/2021 | Givental | G06F 18/285 |
| 2021/0281591 A1* | 9/2021 | Furtak | G06F 18/214 |
| 2021/0344689 A1 | 11/2021 | Mehr | |
| 2021/0350248 A1* | 11/2021 | Rogers | G06N 5/027 |

(56) References Cited

U.S. PATENT DOCUMENTS

| | | | |
|---|---|---|---|
| 2021/0367842 A1* | 11/2021 | Le Guillou | H04L 41/0886 |
| 2022/0014560 A1* | 1/2022 | Crabtree | H04L 63/1433 |
| 2022/0030020 A1* | 1/2022 | Huffman | H04L 63/1425 |
| 2022/0070699 A1* | 3/2022 | Thiyagarajan | H04W 24/04 |
| 2022/0086179 A1* | 3/2022 | Levin | H04W 12/63 |
| 2022/0103577 A1* | 3/2022 | Shah | H04L 63/1416 |
| 2022/0129803 A1* | 4/2022 | Bikumala | G06F 16/906 |
| 2022/0172211 A1* | 6/2022 | Muthuswamy | G06F 16/9024 |
| 2022/0210126 A1* | 6/2022 | Keiser | G06F 9/45558 |
| 2022/0215453 A1* | 7/2022 | Achan | G06F 21/53 |
| 2022/0224721 A1* | 7/2022 | Bertiger | H04L 41/0686 |
| 2022/0239675 A1 | 7/2022 | Panse et al. | |
| 2022/0239683 A1 | 7/2022 | Kaliya et al. | |
| 2022/0253531 A1* | 8/2022 | Kim | G06F 11/323 |
| 2022/0261330 A1 | 8/2022 | Gunda et al. | |
| 2022/0365806 A1 | 11/2022 | Krishna et al. | |
| 2022/0385647 A1* | 12/2022 | Pabón | G06N 20/00 |
| 2022/0407897 A1* | 12/2022 | Raghuvanshi | H04L 41/0663 |
| 2022/0417096 A1* | 12/2022 | Vutukuri | H04L 43/0829 |
| 2023/0007023 A1* | 1/2023 | Andrabi | H04L 63/1425 |
| 2023/0011043 A1* | 1/2023 | Panse | H04L 63/1425 |
| 2023/0011397 A1* | 1/2023 | Panse | H04L 63/20 |
| 2023/0011957 A1* | 1/2023 | Panse | H04L 63/1416 |
| 2023/0131894 A1 | 4/2023 | Panse et al. | |

OTHER PUBLICATIONS

El-Atawy, Adel, et al., "Policy Segmentation for Intelligent Firewall Testing," 1st IEEE ICNP Workshop on Secure Network Protocols, Nov. 6, 2005, 6 pages, IEEE, Boston, MA, USA.

Non-Published Commonly Owned Related U.S. Appl. No. 17/372,264 with similar specification, filed Jul. 9, 2021, 52 pages, VMware, Inc.

Non-Published Commonly Owned Related U.S. Appl. No. 17/372,268 with similar specification, filed Jul. 9, 2021, 53 pages, VMware, Inc.

Oliveira, Ricardo M., et al., "Automatic Detection of Firewall Misconfigurations Using Firewall and Network Routing Policies," Jan. 2009, 6 pages.

Ring, Markus, et al., "Detection of Slow Port Scans in Flow-Based Network Traffic," PLOS One, Sep. 25, 2018, 18 pages, retrieved from https://journals.plos.org/plosone/article?id=10.1371/journal.pone.0204507.

Turcotte, Melissa J. M., et al., "Unified Host and Network Data Set", Aug. 24, 2017, 16 pages, arXiv:1708.07518v1, arXiv.org, Cornell University, Ithaca, NY, USA.

Waye, Lucas, et al., "Cryptographically Secure Information Flow Control on Key-Value Stores," CCS '17: Proceedings of the 2017 ACM SIGSAC Conference on Computer and Communications Security, Oct. 30-Nov. 3, 2017, 15 pages, ACM, Dallas, TX, USA.

Arbuthnot, Tom, "What are Thresholds for Good and Poor Network Packet Loss, Jitter and Round Trip Time for Unified Communications?", Tom Talks, May 17, 2018, 7 pages, retrieved from https://tomtalks.blog/what-are-thresholds-for-good-and-poor-network-packet-loss-jitter-and-round-trip-time-for-unified-communications/.

Non-Published Commonly Owned U.S. Appl. No. 17/220,550, filed Apr. 1, 2021, 54 pages, VMware, Inc.

Non-Published Commonly Owned U.S. Appl. No. 17/220,553, filed Apr. 1, 2021, 55 pages, VMware, Inc.

Non-Published Commonly Owned U.S. Appl. No. 17/355,829, filed Jun. 23, 2021, 44 pages, VMware, Inc.

* cited by examiner

DETECTING THREATS TO DATACENTER BASED ON ANALYSIS OF ANOMALOUS EVENTS

BACKGROUND

In most datacenters, the virtual machines are set up so that they can be accessed remotely. For instance, administrators may have the ability to access VMs using secured shell protocol (SSH), remote desktop protocol (RDP), etc. Some such remote services are prone to attacks, while other services are generally secure but can be exposed to attacks due to minor misconfigurations. However, if one VM is compromised, then even well-configured remote services can be exposed to an attacker (e.g., an attacker gaining access to a VM where a system administrator recently logged in, using a tool to capture passwords in memory, and using those passwords to gain access to other VMs in the datacenter). These so-called "lateral movement" threats can be difficult to detect, in part because much of the activity may appear as normal on its own. As such, better techniques to automatically detect lateral movement threats are needed that do not require an administrator to connect the dots between individual events in a datacenter.

BRIEF SUMMARY

Some embodiments provide an analysis appliance that automatically detects threats (e.g., lateral movement threats) to a datacenter. In some embodiments, the analysis appliance generates a graph of connections between data compute nodes (DCNs) in the datacenter. Upon detection of an anomalous event occurring during a particular time period at a particular DCN, the analysis appliance of some embodiments analyzes the connection graph to determine a set of paths between DCNs in the datacenter that include connections to the particular DCN during the time period. The analysis appliance uses these paths to identify additional anomalous events detected at other DCNs along one or more of the paths during the particular time period and, based on these anomalous events, determines whether the anomalous events indicate a threat to the datacenter.

To detect these threats, some embodiments leverage a data flow collection system for the datacenter that collects and reports attributes of data flows associated with the DCNs executing in the datacenter (e.g., virtual machines (VMs), containers, bare metal computing devices, etc.). Agents on host computers (or operating directly on bare metal computing devices) collect and export data flow information for the data compute nodes (DCNs) to the analysis appliance (which may operate, e.g., as a single server or cluster of servers). Agents on the host computers (e.g., different agents than those that export the data flow information) also export context information to the analysis appliance.

The analysis appliance, in some embodiments, includes multiple detectors that analyze the flow and/or context information to identify anomalous events. These detectors can include real-time (or near real-time) detectors that analyze the flow and/or context information as the information is received from the host computers as well as batch processing detectors that analyze the flow and/or context information in batches at regular intervals (e.g., every 30 minutes, every hour, etc.). These detectors identify various different types of anomalous events at the DCNs in different embodiments. Examples of such anomalous events include port sweeps, non-standard application usage, suspicious network connections, non-standard dropped traffic, vertical and/or slow port scans, password hash collections, the presence of malicious files, etc. Many of these anomalous events can be indications of a lateral movement threat, but can also occur without the presence of such a threat, and therefore the analysis appliance performs the additional analysis to determine whether such events are correlated.

In some embodiments, a graph generation module of the analysis appliance generates the graph of connections between DCNs. In some embodiments, the graph generation module regularly (e.g., in real time as the flow information is received and processed by the analysis appliance) analyzes the flow information to identify remote service connections such as secure shell protocol (SSH) connections, remote desktop protocol (RDP) connections, telnet connections, virtual network computing (VNC) connections, or other connections that allow one DCN to remotely access and control some aspect of another DCN. These sorts of connections are what an attacker often uses when carrying out a lateral movement attack, in order to eventually access a desired DCN and execute the goal of the attack.

The connection graph, in some embodiments, is defined by nodes representing DCNs in the datacenter and edges representing remote service connections between the nodes. If a first DCN accesses a second DCN multiple separate times, then these separate connections are represented by separate edges such that the graph can include multiple edges between the same pair of nodes. In addition to representing a (directed) connection between two DCNs, each edge also stores association information including (i) start and end times for the connection, (ii) the remote service application used for the connection (e.g., RDP, SSH, telnet, VNC, etc.), (iii) the destination port number of the connection, and (iv) the transport layer protocol for the connection (e.g., TCP, UDP, etc.).

The graph generation module of some embodiments maintains the entire connection graph (i.e., data for all of the remote service connections in the datacenter) in a storage (e.g., in volatile memory or a non-volatile storage). To save space, in some embodiments the module removes edges a specified amount of time after the end time for the edge in order to save storage space.

The analysis appliance of some embodiments also includes a lateral movement threat detector that uses the connection graph in order to identify lateral movement threats. As mentioned, numerous detectors regularly analyze the data flow and/or context information received and stored by the analysis appliance in order to identify anomalous events. In some embodiments, at least a subset of these anomalous events (e.g., particular types of events that tend to be more indicative of lateral movement attacks) are provided (e.g., via a queue) to the lateral movement threat detector.

In some embodiments, each particular anomalous event provided to the lateral movement threat detector includes an associated time period and an associated DCN determined by the respective detector module that detected the event. The lateral movement threat detector uses the DCN and time period associated with the particular anomalous event in some embodiments to query the connection graph for one or more paths through the network that include the DCN and are constrained by the time period. The graph generation module (or a separate module, in some embodiments) accesses the graph and identifies paths of remote service connections through the DCNs of the datacenter that could represent a lateral movement attack encompassing the time period of the anomalous event.

Each path, in some embodiments, is represented by a set of nodes of the graph (that includes the node representing the DCN associated with the particular anomalous event) connected by an ordered set of edges. The ordered set of edges represent the order in which an attacker could have moved through the datacenter network (e.g., VM A SSH connection to VM B, VM B RDP connection to VM C, etc.) and are constrained by the time periods associated with the edges. In this discussion, each node other than the initial node in the path has a parent edge (the edge representing the connection used to access the DCN represented by the node) and each node other than the last node in the path has a child edge (the edge representing the connection by which the DCN represented by the node accesses the next DCN in the path). Correspondingly, each edge has a parent node (the node representing the DCN that initiates the connection represented by the edge) and a child node (the node representing the DCN accessed by the parent node).

When identifying a path, some embodiments impose the following constraints or a similar set of constraints (here, the particular node is the node representing the DCN associated with the particular anomalous event). First, the time period associated with the parent edge of the particular node must encompass the time period associated with the anomalous event. In addition, any parent edge of a node in the path is required to have a time period that encompasses the time period of the child edge for that node. Thus, if VM A accesses VM B, which in turn accesses VM C, the entirety of the remote service connection from VM B to VM C should take place within the time period of the remote service connection from VM A to VM B. Furthermore, if VM B is associated with the anomalous event, then this event should also take place during the time period of the remote service connection from VM A to VM B.

The lateral movement threat detector uses these paths of remote service connections (i.e., connection sub-graphs) to determine whether or not the network has likely been attacked by a lateral movement threat. As discussed, each path specifies a set of remote service connections between a set of DCNs, with each connection having an associated time period (i.e., a time period during which a potential attacker was logged into the DCN represented by the child node of the edge representing the connection). The threat detector analyzes other anomalous events received from the various detectors of the analysis appliance to determine whether any of these anomalous events occurred at DCNs along the path at the relevant times. Some embodiments require that the events occur entirely during the time period when the previous DCN in the path was logged into the DCN at which the event occurred, while other embodiments only require that the event start during (or within a specific amount of time after the end of) that login period. In yet other embodiments, the relevant time in relation to the login time period is different for different types of events.

The lateral movement threat detector analyzes the remote service connections in a path and the set of anomalous events identified along the path to determine the likelihood of a lateral movement attack. In different embodiments, the threat detector accounts for different indicators of such a lateral movement attack. For example, some embodiments determine whether the remote service connections in the analyzed path are typically occurring connections (e.g., by analyzing the flow attribute sets stored by the analysis appliance to determine whether the parent DCN regularly accesses the child DCN via remote service connection). Unusual connections are more likely to indicate a lateral movement attack.

Some embodiments analyze the various anomalous events to determine whether these events are of the sort that are typical in a lateral movement attack. For instance, a password hash collection event would be indicative of a lateral movement attack. A non-standard port usage event, while potentially suspicious, is not as likely to be indicative of such an attack. In addition, some embodiments factor in the extent to which the various anomalous events identified along a path are correlated. As an example, a non-standard port usage event on one VM would not necessarily appear to be correlated with a port sweep event observed at a later VM in the path. On the other hand, a password hash collection event on a first VM, followed by a suspicious connection event from the first VM to the second VM and a third event (e.g., a DNS packet size spike) on a third VM accessed from the second VM is more likely to indicate a lateral movement attack.

The lateral movement threat detector accounts for these various factors (e.g., type of anomalous events, whether the connections are usual, correlation of anomalous events) and assigns a score indicative of the likelihood that a lateral movement attack is present. In some embodiments, the lateral movement threat detector also applies remediation techniques. For instance, above a first threshold, the threat detector generates an alert to be presented to a network administrator. If the score exceeds a second (higher) threshold, the threat detector automatically configures firewall rules (e.g., blocking connections from one or more potentially affected DCNs) by interfacing with a network management and control system for the datacenter.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide an analysis appliance that automatically detects threats (e.g., lateral movement threats) to a datacenter. In some embodiments, the analysis appliance generates a graph of connections between data compute nodes (DCNs) in the datacenter. Upon detection of an anomalous event occurring during a particular time period at a particular DCN, the analysis appliance of some embodiments analyzes the connection graph to determine a set of paths between DCNs in the datacenter that include connections to the particular DCN during the time period. The analysis appliance uses these paths to identify additional anomalous events detected at other DCNs along one or more of the paths during the particular time period and, based on these anomalous events, determines whether the anomalous events indicate a threat to the datacenter.

To detect these threats, some embodiments leverage a data flow collection system for the datacenter that collects and reports attributes of data flows associated with the DCNs executing in the datacenter (e.g., virtual machines (VMs), containers, bare metal computing devices, etc.). Agents on host computers (or operating directly on bare metal computing devices) collect and export data flow information for the data compute nodes (DCNs) to the analysis appliance (which may operate, e.g., as a single server or cluster of servers). Agents on the host computers (e.g., different agents than those that export the data flow information) also export context information to the analysis appliance.

Figure 1:
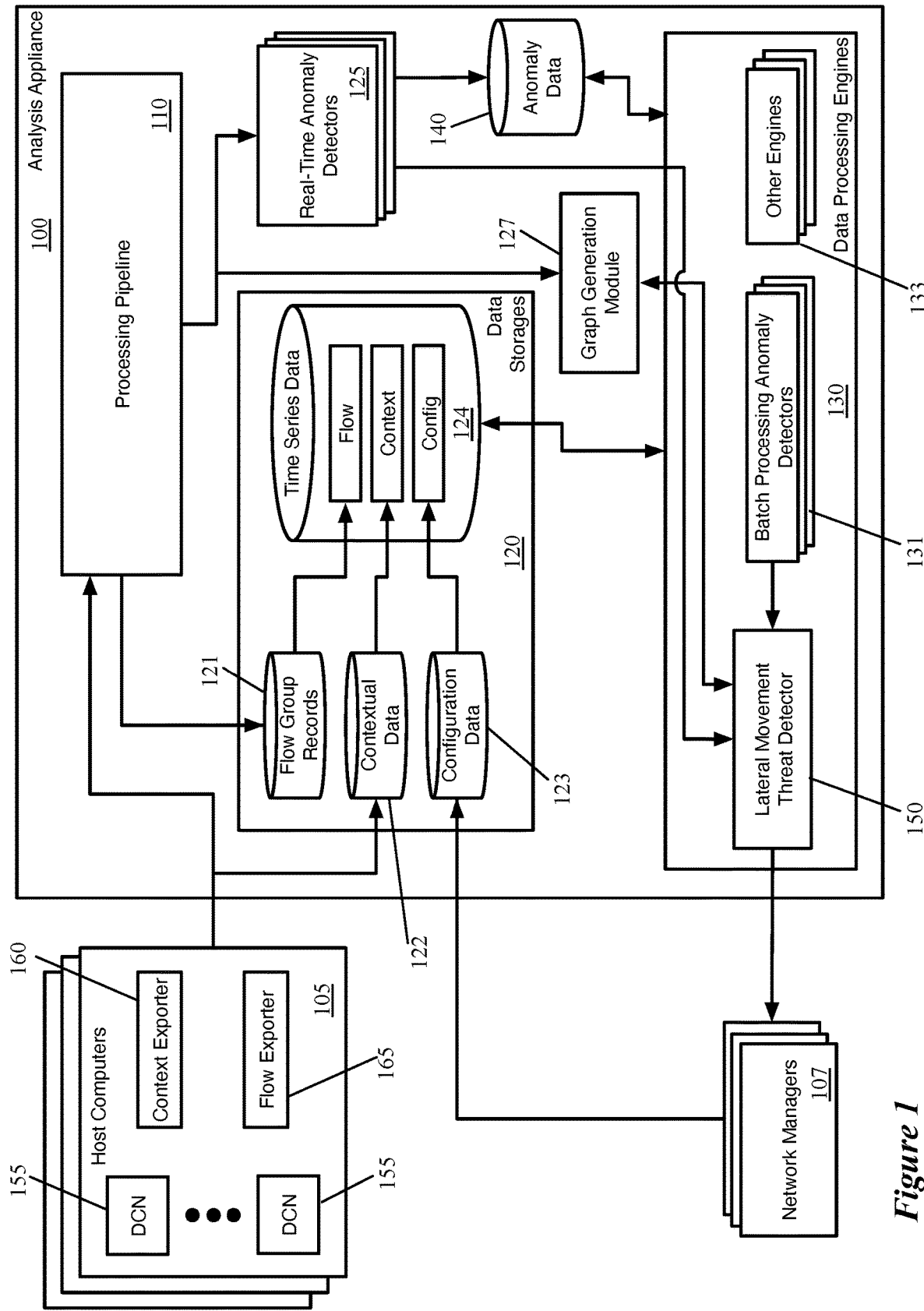
FIG. 1 conceptually illustrates an analysis appliance of some embodiments.

FIG. 1 conceptually illustrates the analysis appliance 100 of some embodiments, as well as network managers 107 and host computers 105. This analysis appliance 100 may be executed on a single machine (e.g., a single bare metal computer, VM, container, etc.) or a cluster of machines (e.g., multiple bare metal computers, multiple VMs, multiple containers, and/or a combination thereof). The analysis appliance 100 includes a processing pipeline 110 for flow data (e.g., flow attribute sets received from host computers), a set of data storages 120 for storing received data, a set of real-time anomaly detectors 125, a graph generation module 127, and a set of data processing engines 130 that includes a lateral movement threat detector 150 and a set of batch processing anomaly detectors 131 as well as other engines 133. It should be noted that while the description above and below often refers to the analysis appliance analyzing the flow information for a datacenter, this could include information for either a single datacenter or multiple datacenters that are managed by the same set of network managers and all of which report information to the analysis appliance.

The host computers 105 will be described in greater detail below by reference to FIG. 2. As shown, these host computers execute one or more DCNs 155 (e.g., VMs, containers, etc.) that can run services, applications, etc. These DCNs 155 send and receive data traffic, which are organized as data message flows and are processed by other modules executing on the host computers 105. In some embodiments, the host computers can also include bare metal computing devices that send their own data traffic (e.g., with applications running directly on the operating system of the bare metal computing device). Each host computer 105 also executes (e.g., within virtualization software) a context exporter 160 and a flow exporter 165, which are associated with the analysis appliance 100. The context exporter 160 collects context data regarding the DCNs 155 and provides this data to the analysis appliance 100. The flow exporter 165 collects information about data flows to and from the DCNs 155 and provides this data to the analysis appliance 100.

The network managers 107 provide configuration data to the analysis appliance 100, including management plane configuration data and policy configuration data. This policy configuration data can include distributed firewall rules enforced by the host computers 105 as well as security group memberships that are used to define these firewall rules. For instance, in some embodiments, each time a firewall rule is added, deleted, or modified, these changes are provided by the network managers 107 to the analysis appliance 100. Similarly, each time the membership of a security group changes, due to the creation, deletion, or modification of a DCN or because the definition of the group has changed (or a group has been wholesale created or deleted), these changes are provided to the analysis appliance 100 along with timestamps specifying when each change was made.

In addition, the analysis appliance 100 communicates control messages (e.g., updates to service rule policies, updated keys, updated group memberships validated by a user, etc.) through the network managers 107. In some embodiments, a user (e.g., an administrator, not shown) can interact with the analysis appliance 100 directly (e.g., to provide feedback regarding alerts generated by the analysis appliance, to interact with a user interface generated by the analysis appliance, etc.).

The processing pipeline 110, in some embodiments, processes flow data (e.g., flow attribute sets, also referred to as flow group records) received from the host computers in the system for analysis by other elements of the appliance (e.g., the anomaly detectors 125). When two DCNs 155 within the datacenter communicate with each other and their respective host computers 105, both provide flow attribute sets for the flow to the analysis appliance 100. The processing pipeline 110 deduplicates these flow attribute sets (i.e., into a single flow attribute set). This deduplication process matches these flows (e.g., based on flow keys) and, in some embodiments, generates a new flow attribute set for the data flow that includes all unique attributes from both the source and destination host computer flow attribute sets. The processing pipeline 110 stores these flow attribute sets in the data storages 120 (e.g., the flow group records 121). In some embodiments, in addition to deduplication, the processing pipeline 110 also identifies and groups corresponding flow attribute sets (e.g., for reverse direction flows or otherwiserelated flows). These flow attribute sets are also combined and stored in, e.g., the flow group records 121. In some embodiments, the flow data includes flow attribute sets for data flows that are dropped/blocked. When a data flow is dropped or blocked at the source host computer 105 (i.e., the host computer 105 at which the source DCN is located), deduplication is not required because the flow will not appear at the destination.

The processing pipeline 110 of some embodiments also fills in missing information for flow attribute sets, if needed (e.g., DCN identifiers for remote DCNs, etc.), using other flow attribute sets or other information (e.g., by matching DCN identifiers to network addresses already present in the flow attribute sets). Correlation of flow attribute sets can again be performed after this missing information is filled in. Additional description of the processing pipeline 110 is found in U.S. Patent Publication 2021/0029050, which is incorporated herein by reference.

The data storages 120 include, in some embodiments, a data storage for each different type of data received (e.g., a correlated flow group record data storage 121, a contextual attribute data storage 122, a configuration data storage 123, and a time series data storage 124). The contextual attribute data storage 122, in some embodiments, stores received contextual attribute data from multiple host computers and uses that data for populating the time series data storage 124 with contextual attribute data (e.g., in a contextual attribute topic). In some embodiments, the contextual attribute data storage 122 is used in correlating contextual attributes with flow group records for display. The time series data storage 124 is used additionally, or alternatively, in other embodiments, for correlating contextual attribute data to flow group record data.

The contextual attribute data storage 122, in some embodiments, receives contextual attribute data sets including any, or all, of: data regarding guest metadata, guest events, and guest DCN metrics. In some embodiments, the guest metadata includes any or all of DCN details (a universally unique identifier [uuid], a bios uuid, and a vmxpath), operating system details (type of OS and version information), and process details (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that many additional pieces of information may be provided to a contextual attribute data storage and that the partial list above serves only as an example.

In some embodiments, the set of data storages 120 includes a flow group record data storage 121. In some embodiments, this data storage 121 stores flow attribute sets after aggregation and correlation with configuration data stored in the configuration data storage 123. The flow group record data storage 121, in some embodiments, also stores learned pairings of IP addresses and DCN identifiers. In some embodiments, the learning is based on previously processed flow record groups. The correlated flow group record data storage 121, in some embodiments, provides processed (e.g., aggregated and correlated) flow group records to the time series data storage.

The configuration data storage 123, in some embodiments, receives configuration data (e.g., management plane configuration and/or policy configuration) from a network manager controller. The management plane configuration data includes information relating to group membership (in terms of DCN), and the policy configuration data sets include information about service rules (e.g., firewall rules), in some embodiments. The service rules, in some embodiments, are expressed in terms of any of IP addresses, ports, protocols, security groups, etc., in any combination. In some embodiments, an initial set of configuration data is sent at startup or reboot of either the network manager computer or the analysis appliance, while subsequent configuration data sets include only changes to the last configuration data set.

The time series data storage 124, in some embodiments, stores flow group records, configuration data, and context data. In some embodiments, the time series data storage 124 is organized by topic with each different type of data stored in a different topic. Additionally, in some embodiments, each topic is organized in a time series fashion by use of an index that is appended to each set of data and is coordinated among all the producers of data for the topic. The time series data storage 124 is organized at multiple levels of temporal granularity, in some embodiments. In some embodiments, the different levels of granularity include some combination of hourly, daily, weekly, and monthly levels. The different levels of temporal granularity are used, in some embodiments, for data collected for a previous 24 hours (e.g., organized on an hourly basis), data for a previous 6 days (e.g., organized on a daily basis), data for a previous 30 days (e.g., organized on a daily or weekly basis), and data received more than 30 days earlier (e.g., organized on a monthly basis). The data organized based on the various levels of temporal granularity are, in some embodiments, periodically (e.g., daily, hourly, etc.) rolled up into the next level of granularity.

Real-time (or near-real-time) anomaly detectors 125, in some embodiments, analyze the correlated flow attribute sets as this flow information is received and correlated by the processing pipeline 110 (as opposed to retrieving data from the storages 120). In some embodiments, the processing pipeline 110 provides the flow information (possibly also correlated to contextual attribute information) to the real-time anomaly detectors as batches of flow attribute sets are correlated and processed. These anomaly detectors 125 detect various types of anomalies (e.g., port sweeps, suspicious network connections, etc.) and store records of each detected anomalous event in the anomaly storage 140 (e.g., a database). As described further below, each record of an anomalous event indicates at least a start and end time for the event, one or more associated DCNs, and a description of the event. The anomaly detectors 125 also provide at least a subset of the anomalous event records (e.g., records for particular types of anomalous events) directly to the lateral movement threat detector 150.

The graph generation module 127 also receives correlated flow attribute sets in real-time (or near-real-time) and generates one or more graphs of at least a subset of these connections. For instance, as described in more detail below, the graph generation module 127 generates a graph of remote service connections within the datacenter. The graph generation module 127 can also generate time-constrained sub-graphs to be provided to the lateral movement threat detector 150 in some embodiments.

The data processing engines 130, as mentioned, include the lateral movement threat detector 150, a set of batch processing anomaly detectors 131, and a set of other engines 133. The batch processing anomaly detectors 131 analyze the time series data 124 at regular intervals (e.g., every 20 minutes, every 30 minutes, every hour, etc.) to detect various types of anomalous events in the datacenter network. For instance, these anomaly detectors 131 might look for anomalous amounts of dropped traffic, the presence of malicious files on a DCN, vertical port scans, password and/or hash collection taking place on a DCN, etc. Like the real-time anomaly detectors 125, the batch processing anomaly detectors both store records of the detected anomalous events into the anomaly storage 140 and provide at least a subset of the anomalous event records directly to the lateral movement threat detector 150.

The lateral movement threat detector 150 assesses the anomalous events detected by the various anomaly detectors 125 and 131 to determine the likelihood that a lateral movement threat to the datacenter is present. This analysis, described in further detail below, involves using the graph generation module 127 to identify time-constrained sets of remote service connections that could be indicative of a lateral movement attack, identifying anomalous events that took place during the same time as these remote service connections, and assessing whether these events appear correlated and indicative of such an attack.

The other engines 133 perform various other tasks, including generation of a graphical user interface through which an administrator can interact with and control the analysis appliance 100 and additional processing of anomalous events. The graphical user interface of some embodiments provides information about DCNs, flows, contextual attributes, anomalous events, etc. Additional information about the data storages 120 and the data processing engines 130 can be found in U.S. Patent Publication 2021/0029050, which is incorporated by reference above.

Figure 2:
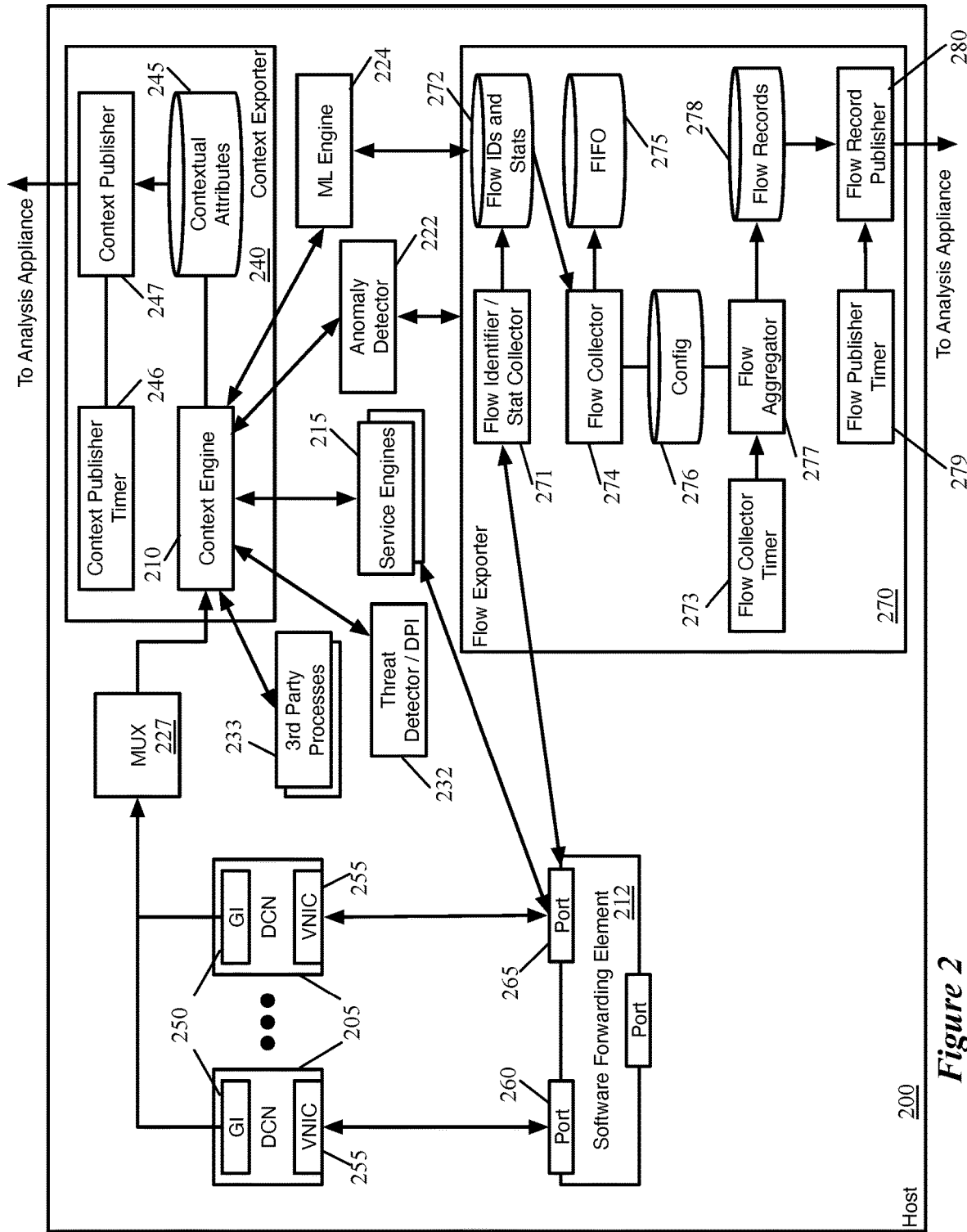
FIG. 2 conceptually illustrates a host computer of some embodiments.

FIG. 2 conceptually illustrates a host computer 200 (e.g., one of the host computers 105) of some embodiments in more detail, specifically focusing on the context exporter 240 and flow exporter 270 that collect, aggregate, and publish aggregated data to the analysis appliance. As shown, the host computer 200 also executes several data compute nodes (DCNs) 205, a set of service engines 215, a threat detector/deep packet inspection (DPI) module 232, a set of third-party processes 233, a MUX (multiplexer) 227, an anomaly detector 222, a machine learning (ML) engine 224, and a software forwarding element 212.

Guest introspection agents 250 execute on the DCNs 205 and extract context data from the DCNs 205. For example, a guest introspection agent 250, in some embodiments, detects that a new data flow has been initiated (e.g., by sending a SYN packet in a data flow using TCP) and collects introspection data (e.g., a set of attributes of the data flow and DCN). The introspection data, in some embodiments, includes any, or all, of data regarding (i) guest metadata, (ii) guest events, and (iii) guest DCN metrics. In some embodiments, the guest metadata includes any, or all, of data regarding DCN 205 (a universally unique identifier [uuid], a bios uuid, and a vmxpath), operating system data (type of OS and version information), and process data (e.g., process ID, creation time, hash, name, command line, security ID [sid], user ID [uid], loaded library or module information, process metrics [e.g., memory usage and CPU usage], process version, parent process ID, etc.). Guest events, in some embodiments, include DCN events (e.g., power on and power off), user login events (e.g., login, logoff, connect, and disconnect events, a session ID, a timestamp, a DCN IP, and a connected client IP), and service process events (e.g., event type [e.g., listen start, listen stop], timestamp, destination DCN IP, destination port number, and process details). Guest DCN metrics, in some embodiments, include memory usage and CPU usage. It should be understood that much of the context data, in some embodiments, is not included in L2-L7 headers of a flow and that many additional pieces of information may be collected by guest introspection agent 250. The partial list above serves only as an example of the types of information that can be gathered by guest introspection agent 250.

In some embodiments, the guest introspection agents 250 send the collected context information to the context exporter 240 (specifically to the context engine 210) through a multiplexer 227. The context exporter 240 includes the context engine 210, a contextual attribute storage 245, a context publisher timer 246, and a context publisher 247. The context exporter 240 processes context data (e.g., contextual attribute data sets) at the host computer 200 and publishes the context data to the analysis appliance. The context engine 210 also provides the received context information to other elements operating in the host computer 200 and correlates this context data with context data received from other sources.

In some embodiments, the other sources include the set of service engines 215, the threat detector/DPI module 232, third-party software (processes) 233, the anomaly detector 222, and the ML engine 224. The context engine 210, in some embodiments, correlates the context data from the multiple sources for providing the correlated context data (e.g., sets of correlated contextual attributes) to the context publisher 247 (e.g., through context attribute storage 245).

As shown, each DCN 205 also includes a virtual network interface controller (VNIC) 255 in some embodiments. Each VNIC is responsible for exchanging messages between its respective DCN and the SFE 212 (which may be, e.g., a virtual switch or a set of virtual switches). Each VNIC 255 connects to a particular port 260-265 of the SFE 212. The SFE 212 also connects to a physical network interface controller (PNIC) (not shown) of the host. In some embodiments, the VNICs are software abstractions of one or more physical NICs (PNICs) of the host created by the virtualization software of the host (within which the software forwarding element 212 executes).

In some embodiments, the SFE 212 maintains a single port 260-265 for each VNIC of each DCN. The SFE 212 connects to the host PNIC (through a NIC driver [not shown]) to send outgoing messages and to receive incoming messages. In some embodiments, the SFE 212 is defined to include one or more ports that connect to the PNIC driver to send and receive messages to and from the PNIC. The SFE 212 performs message-processing operations to forward messages that it receives on one of its ports to another one of its ports. For example, in some embodiments, the SFE 212 tries to use data in the message (e.g., data in the message header) to match a message to flow-based rules, and upon finding a match, to perform the action specified by the matching rule (e.g., to hand the message to one of its ports, which directs the message to be supplied to a destination DCN or to the PNIC).

In some embodiments, the SFE 212 is a software switch (e.g., a virtual switch), while in other embodiments it is a software router or a combined software switch/router, and may represent multiple SFEs (e.g., a combination of virtual switches and virtual routers). The SFE 212, in some embodiments, implements one or more logical forwarding elements (e.g., logical switches or logical routers) with SFEs 212 executing on other hosts in a multi-host environment. A logical forwarding element, in some embodiments, can span multiple hosts to connect DCNs that execute on different hosts but belong to one logical network. Different logical forwarding elements can be defined to specify different logical networks for different users, and each logical forwarding element can be defined by multiple software forwarding elements on multiple hosts. Each logical forwarding element isolates the traffic of the DCNs of one logical network from the DCNs of another logical network that is serviced by another logical forwarding element. A logical forwarding element can connect DCNs executing on the same host and/or different hosts, both within a datacenter and across datacenters. In some embodiments, the SFE 212 extracts from a data message a logical network identifier (e.g., a VNI) and a MAC address. The SFE 212, in such embodiments, uses the extracted VNI to identify a logical port group or logical switch, and then uses the MAC address to identify a port within the port group or logical switch.

The ports of the SFE 212, in some embodiments, include one or more function calls to one or more modules that implement special input/output (I/O) operations on incoming and outgoing messages that are received at the ports 260-265. Examples of I/O operations that are implemented by the ports 260-265 include ARP broadcast suppression operations and DHCP broadcast suppression operations, as described in U.S. Pat. No. 9,548,965. Other I/O operations (such as firewall operations, load-balancing operations, network address translation operations, etc.) can be so implemented in some embodiments of the invention. By implementing a stack of such function calls, the ports 260-265 can implement a chain of I/O operations on incoming and/or outgoing messages in some embodiments. Also, in some embodiments, other modules in the data path (such as the VNICs 255 and the ports 260-265, etc.) implement the I/O function call operations instead of, or in conjunction with, the ports 260-265. In some embodiments, one or more of the function calls made by the SFE ports 260-265 can be to service engines 215, which query the context engine 210 for context information that the service engines 215 use (e.g., to generate context headers that include context used in providing a service and to identify service rules applied to provide the service). In some embodiments, the generated context headers are then provided through the port 260-265 of SFE 212 to flow exporter 270 (e.g., flow identifier and statistics collector 271).

The service engines 215 can include a distributed firewall engine of some embodiments that implements distributed firewall rules configured for the datacenter network. These distributed firewall rules are, in some embodiments, defined in terms of rule identifiers, and specify whether to drop or allow traffic from one group of DCNs to another group of DCNs. The firewall rules can be specified in terms of source and destination network addresses (e.g., IP and/or MAC addresses) and/or security groups (which are converted to network addresses). For instance, a firewall rule might be defined at the network manager level as allowing any traffic from a set of web server VMs running the Linux operating system (a first security group) to a set of database server VMs running the Windows operating system (a second security group). This firewall rule is then translated into a set of more specific rules based on the membership of the DCNs in the first and second security groups using the IP and/or MAC addresses of these DCNs.

The flow exporter 270 monitors flows, collects flow data and statistics, aggregates flow data into flow group records, and publishes flow attribute sets (also referred to as flow group records) for consumption by the analysis appliance. In some embodiments, the flow exporter 270 generally aggregates statistics for individual flows identified during multiple time periods, and for each time period identifies multiple groups of flows with each group including one or more individual flows. For each identified flow group, the flow exporter 270 identifies a set of attributes by aggregating one or more subsets of attributes of one or more individual flows in the group as described below in greater detail. In some embodiments, the subset of attributes of each individual flow in each group is the aggregated statistics of the individual flow. After the multiple time periods, flow exporter 270 provides the set of attributes for each group identified in the multiple time periods to the analysis appliance for further analysis of the identified flows.

As shown, the flow exporter 270 includes a flow identifier/statistics collector 271, a flow identifier and statistics storage 272, a flow collector timer 273, a flow collector 274, a first-in first-out (FIFO) storage 275, a configuration data storage 276, a flow aggregator 277, a flow group record storage 278, a flow publisher timer 279, and a flow group record publisher 280. These modules collectively collect and process flow data to produce and publish flow attribute sets.

The flow exporter 270 receives flow information, including flow identifiers and statistics, at the flow identifier/statistics collector 271. In some embodiments, the received flow information is derived from individual data messages that make up the flow and includes context data used in making service decisions at service engines 215. In some embodiments, the flow information also specifies which firewall rules are applied to each flow (e.g., using firewall rule identifiers). The flow exporter 270 stores the received information associated with particular flows in the flow identifier and statistics storage 272. The statistics, in some embodiments, are summarized (accumulated) over the life of the particular flow (e.g., bytes exchanged, number of packets, start time, and duration of the flow).

The flow collector 274, in some embodiments, monitors the flows to determine which flows have terminated (e.g., timeouts, FIN packets, RST packets, etc.) and collects the flow identifiers and statistics and pushes the collected data to FIFO storage 275. In some embodiments, the flow collector 274 collects additional configuration data from configuration data storage 276 and includes this additional configuration data with the data collected from flow identifier and statistics storage 272 before sending the data to FIFO storage 275.

Additionally, the flow collector 274, in some embodiments, collects data for long-lived active flows (e.g., flows lasting longer than half a publishing period) from the flow identifier and statistics storage 272 before the end of a publishing period provided by flow publisher timer 279. In some embodiments, the data collected for a long-lived active flow is different from the data collected for terminated flows. For example, active flows are reported using a start time but without a duration in some embodiments. Some embodiments also include flows that are initiated but dropped/blocked based on firewall rules.

Only flows meeting certain criteria are collected by the flow collector 274 in some embodiments. For example, only information for flows using a pre-specified set of transport layer protocols (e.g., TCP, UDP, ESP, GRE, SCTP) are collected, while others are dropped or ignored. In some embodiments, additional types of traffic, such as broadcast and multicast, safety check (e.g., having ruleID=0 or 0 rx and tx byte/packet counts), L2 flows, flows which are not classified as one of (i) inactive, (ii) drop, or (iii) reject, are dropped (i.e., not collected or not placed into FIFO storage 275).

In some embodiments, the FIFO storage 275 is a circular or ring buffer such that only a certain number of sets of flow identifiers and flow statistics can be stored before old sets are overwritten. In order to collect all the data placed into FIFO storage 275, or at least to not miss too much (e.g., miss less than 5% of the data flows), the flow aggregator 277 pulls data stored in FIFO storage 275 based on a flow collection timer 273 and aggregates the pulled data into aggregated flow group records. Some embodiments pull data from the FIFO storage 275 based on a configurable periodicity (e.g., every 10 seconds), while other embodiments, alternatively or in addition to the periodic collection, dynamically determine when to collect data from FIFO storage 275 based on a detected number of data flows (e.g., terminated data flows, a total number of active data flows, etc.) and the size of FIFO storage 275. Each set of flow data pulled from FIFO storage 275 for a particular flow, in some embodiments, represents a unidirectional flow from a first endpoint (e.g., machine or DCN) to a second endpoint. If the first and second endpoints both execute on the same host computer 200, in some embodiments, a same unidirectional flow is captured at different ports 260-265 of the software forwarding element 212. To avoid double counting a same data message provided to the flow identifier 271 from the two ports 260-265, the flow identifier 271 uses a sequence number or other unique identifier to determine if the data message has been accounted for in the statistics collected for the flow. Even if duplicate data messages for a single unidirectional flow have been accounted for, the flow aggregator 277 additionally combines sets of flow data received for the separate unidirectional flows into a single set of flow data in some embodiments. This deduplication (deduping) of flow data occurs before further aggregation in some embodiments and, in other embodiments, occurs after an aggregation operation.

The flow aggregator 277, in some embodiments, receives a set of keys from the analysis appliance through the network manager computer that specify how the flow data sets are aggregated. After aggregating the flows, the flow aggregator 277 performs a deduplication process to combine aggregated flow group records for two unidirectional flows between two DCNs 205 executing on host machine 200 into a single aggregated flow group record and stores the aggregated records in flow group record storage 278. From flow group record storage 278, flow group record publisher 280 publishes the aggregated flow group records to an analysis appliance according to a configurable timing provided by flow publisher timer 279. After publishing the aggregated flow group records (and, in some embodiments, receiving confirmation that the records were received), the records stored for the previous publishing time period are deleted and a new set of aggregated flow group records are generated.

In some embodiments, one of the flow aggregator 277 and the context engine 210 performs another correlation operation to associate the sets of correlated contextual attributes stored in contextual attribute storage 245 with the aggregated flow group records stored in the flow group record storage 278. In some embodiments, the correlation includes generating new flow attribute sets with additional attribute data included in existing attribute fields or appended in new attribute fields. In other embodiments, the sets of correlated contextual attributes and aggregated flow group records are tagged to identify related sets of aggregated flow group records and contextual attribute data. In some embodiments, the generated new flow group records are published from one of the publishers (e.g., flow group record publisher 280 or context publisher 247). In other embodiments, flow group record publisher 280 publishes the tagged aggregated flow group records and the context publisher 247 publishes the tagged sets of correlated contextual attributes.

The anomaly detection engine 222, in some embodiments, receives flow data (from any of flow identifier and statistics storage 272, FIFO storage 275, or flow group record storage 278) and context data from context engine 210 and detects, based on the received data, anomalous behavior associated with the flows. For example, based on context data identifying the application or process associated with a flow, anomaly detection engine 222 determines that the source port is not the expected source port and is flagged as anomalous. The detection, in some embodiments, includes stateful detection, stateless detection, or a combination of both. Stateless detection does not rely on previously collected data at the host, while stateful detection, in some embodiments, maintains state data related to flows and uses the state data to detect anomalous behavior. For example, a value for a mean round trip time (RTT) or other attribute of a flow and a standard deviation for that attribute may be maintained by anomaly detection engine 222 and compared to values received in a current set of flow data to determine that the value deviates from the mean value by a certain number of standard deviations that indicates an anomaly. In some embodiments, anomaly detection engine 222 appends a field to the set of context data that is one of a flag bit that indicates that an anomaly was detected or an anomaly identifier field that indicates the type of anomaly detected (e.g., a change in the status of a flow from allowed to blocked [or vice versa], a sloppy or incomplete TCP header, an application/port mismatch, or an insecure version of an application). In some embodiments, the additional context data is provided to context engine 210 separately to be correlated with the other context data received at context engine 210. As will be understood from the discussion above, the anomaly detection process may use contextual attributes not in L2-L4 headers such as data included in L7 headers and additional context values not found in headers.

In some embodiments, the anomaly detection engine 222 takes an action or generates a suggestion based on detecting the anomaly. For example, anomaly detection engine 222 can block an anomalous flow pending user review or suggest that a new firewall rule be added to a firewall configuration. In some embodiments, the anomaly detection engines 222 on each host computer 200 can report these anomalies (e.g., via the context publisher 247) to the analysis appliance for further analysis by the anomaly processing engine.

The machine learning engine 224, in some embodiments, receives flow data (from any of the flow identifier and statistics storage 272, the FIFO storage 275, and the flow group record storage 278) and context data from the context engine 210 and performs analysis on the received data. The received data (e.g., flow group records), in some embodiments, includes attributes normally recorded in a 5-tuple as well as additional L7 attributes and other contextual attributes such as user sid, process hash, URLs, appId, etc., that allow for better recommendations to be made (e.g., finer-grained firewall rules). In some embodiments, the analysis identifies possible groupings of DCNs 205 executing on the host computer 200. In some embodiments, the analysis is part of a distributed machine learning process, and the results are provided to the context engine 210 as an additional contextual attribute.

Figure 3:
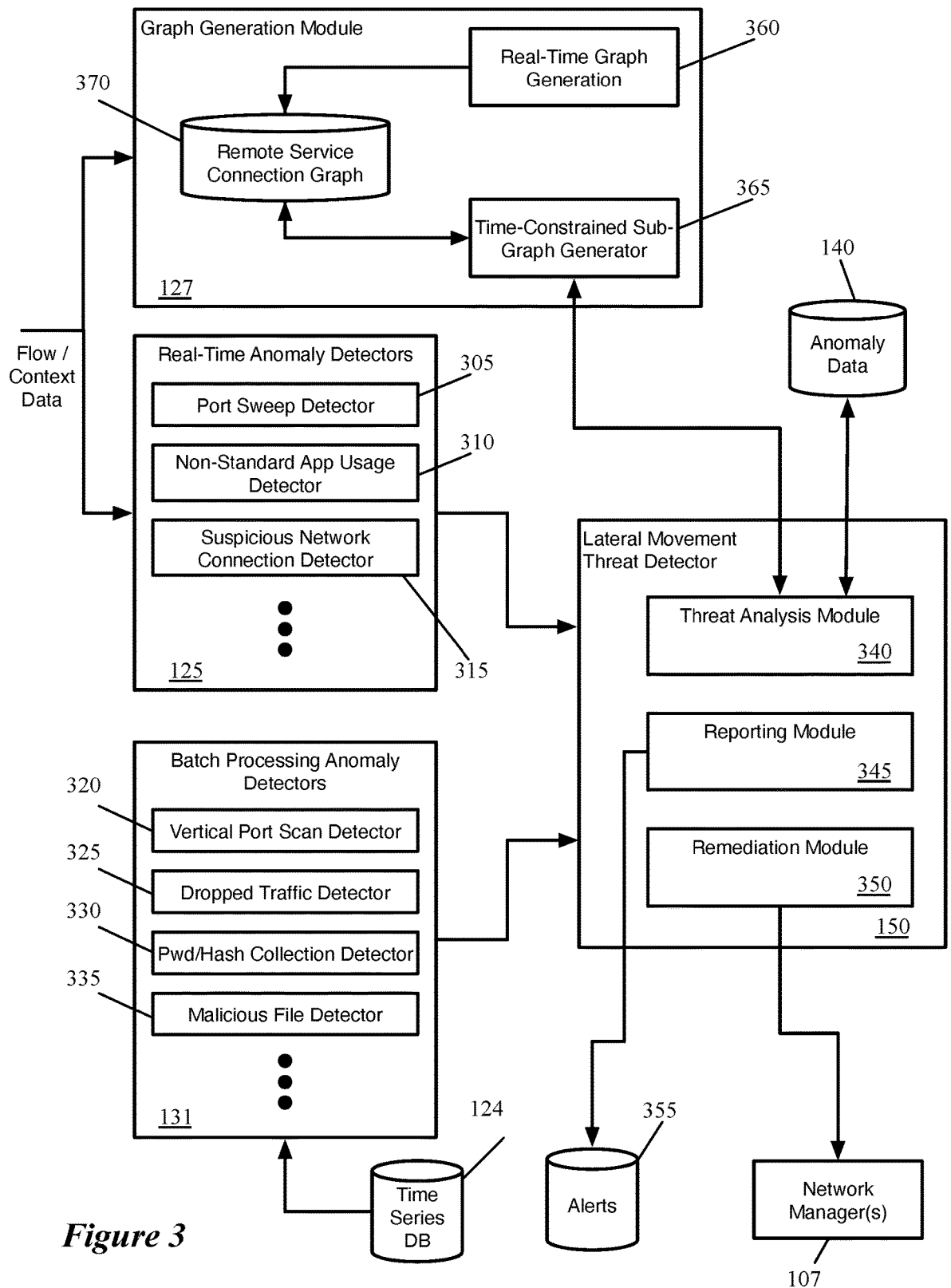
FIG. 3 conceptually illustrates more details of the graph generation module, lateral movement threat detector, and anomaly detectors of the analysis appliance of some embodiments.

FIG. 3 conceptually illustrates more details of the graph generation module 127, lateral movement threat detector 150, and anomaly detectors 125 and 131 of the analysis appliance 100 of some embodiments. The analysis appliance of some embodiments includes multiple detectors that analyze the flow and/or context information to identify anomalous events. As shown in the figure, these detectors can include real-time (or near real-time) anomaly detectors 125 that analyze the flow and/or context information as the information is received from the host computers and correlated by the processing pipeline as well as batch processing anomaly detectors 131 that analyze the flow and/or context information in batches at regular intervals (e.g., every 30 minutes, every hour, etc.). These batch processing anomaly detectors retrieve flow and/or context information (and, in some cases, policy configuration information) from the time series database 124 in order to perform their analysis.

These detectors 125 and 150 identify various different types of anomalous events at the DCNs in different embodiments. Examples of real-time detectors include a port sweep detector 305, a non-standard application usage detector 310, a suspicious network connection detector 315, as well as other anomalous event detectors. The port sweep detector 305 identifies when a DCN either performs or is the subject of a potential port sweep attack. The non-standard application usage detector 310 identifies when a DCN runs an application that is out of the ordinary or unexpected in some way. The suspicious network connection detector 315 identifies network connections between two DCNs that are uncommon and unexpected in some way (e.g., a remote service connection between two VMs that have not communicated in the past).

Examples of batch processing anomaly detectors include a vertical port scan detector 320, a dropped traffic detector 325, a password/hash collection detector 330, a malicious file detector 335, as well as other anomalous event detectors. The vertical port scan detector 320 identifies when a DCN is the likely subject of a vertical port scan by an attacker. The dropped traffic detector 325 identifies when an anomalous amount of traffic sent from or directed to a particular DCN has been dropped (e.g., due to a misconfigured firewall rule or other policy). The password/hash collection detector 330 uses context information to identify when a password stealing tool (e.g., Mimikatz) has been run on a DCN (e.g., to capture any credentials stored in memory). The malicious file detector 335 uses context information to identify when a malicious file is present on a DCN.

Many of these anomalous events may be indications of a lateral movement attack but can also occur without the presence of such a threat. In addition, some anomalous events are more likely to indicate the presence of a lateral movement attack, especially when identified in conjunction with other events. For instance, a remote service connection between two VMs that never communicate is often indicative of a lateral movement attack, while a port sweep without any other related anomalous events is not so likely to indicate such an attack (though this may be indicative of a different problem for the datacenter).

As such, the lateral movement threat detector 150 performs additional analysis based on the detected anomalous events to determine the likelihood that sets of events are correlated and indicative of a lateral movement attack. The lateral movement threat detector 150, in some embodiments, includes a threat analysis module 340, a reporting module 345, and a remediation module 350.

The threat analysis module 340 receives information about at least a subset of the anomalous events detected by the various detectors 125 and 150 (e.g., events from certain detectors, events meeting a particular set of criteria, etc.). In some embodiments, this subset of anomalous events is stored in a queue that is accessed by the threat analysis module 340. For a given anomalous event having a particular associated DCN and associated time period during which the event took place, the threat analysis module requests (e.g., via a query) a set of remote service connection sub-graphs (i.e., a set of time-ordered remote service connections) constrained by the particular DCN and time period associated with the event from the graph generation module 127.

The threat analysis module 340 receives these sets of time-ordered connections and uses the connections to identify other detected anomalous events that might be related from the anomalous event data storage 140. As will be described further below, the identification of other anomalous events is based on the time periods of each remote service connection and the time periods associated with the anomalous events. The threat analysis module 340 analyzes these detected events to determine whether the remote service connections and anomalies likely indicate a lateral movement attack.

In some embodiments, the threat analysis module 340 assigns a score to this likelihood. If the score is above a first threshold, the reporting module 345 generates an alert and stores a record of this alert to the alerts data store 355. This alert can then be provided to a network administrator (e.g., through a user interface of the analysis appliance). If the score is also above a second threshold, the remediation module 350 automatically generates a set of firewall rules (e.g., to isolate one or more DCNs under attack) and provides these firewall rules to the network managers 107. This allows the network managers to configure various network elements (e.g., distributed firewall elements, gateway firewalls, etc.) to implement the firewall rules in the network.

The graph generation module 127 includes a real-time graph generator 360 and a time-constrained sub-graph generator 365, and stores a remote service connection graph 370. The real-time graph generator 360 receives flow information that is received by the analysis appliance from the host computers and correlated by the processing pipeline, identifies remote service connections within the flows, and generates a graph 370 of these remote service connections. The remote service connection graph 370 of some embodiments includes all of the remote service connections within the datacenter (or all such connections that are recent enough). The nodes of this graph are the DCNs in the datacenter, while edges of the graph are the remote service connections. These edges include start and end times for the remote service connections, which are used to generate the time-constrained sub-graphs.

The time-constrained sub-graph generator 365 receives a query from the lateral movement threat detector 150 that requests time-ordered sets of connections (sub-graphs) based on information about an anomalous event (e.g., a DCN and a time duration). The sub-graph generator 365 accesses the full remote service connection graph 370 to generate a set of (zero or more) sub-graphs according to a set of time-based rules that constrain when edges can be added to a sub-graph. The time-constrained sub-graph generator 365 sends these sets of connections back to the lateral movement threat detector 150 for the threat analysis module 340 to use in determining the likelihood that the datacenter is under a lateral movement attack. The operations of the graph generation module 127 will now be described in more detail.

Figure 4:
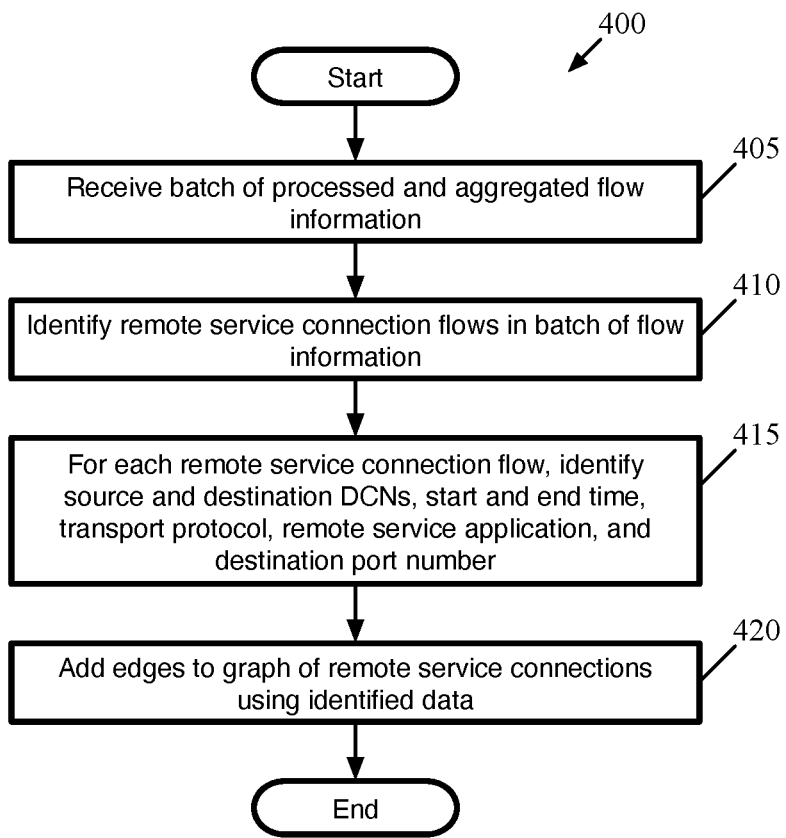
FIG. 4 conceptually illustrates a process of some embodiments for generating a graph of remote service connections in a datacenter network.

FIG. 4 conceptually illustrates a process 400 of some embodiments for generating a graph of remote service connections in a datacenter network. This process 400, in some embodiments, is performed by a graph generation module of an analysis appliance such as that described above (e.g., by the real-time graph generation module 360). The graph generation module of some embodiments actually performs the process 400 (or a similar process) regularly as new flow information is received and correlated by the analysis appliance.

As shown, the process 400 begins by receiving (at 405) a batch of processed and aggregated flow information. As described above by reference to FIG. 1, the analysis appliance processing pipeline of some embodiments processes incoming flow attribute sets to remove duplicate flows and, in some cases, map the flow information to context attributes. Each correlated flow attribute set specifies a variety of information about the flow, including start time, end time (if the flow is no longer active), source and destination DCN (for flows between two DCNs in the datacenter rather than between a DCN and an external endpoint), five-tuple (i.e., source and destination network address, source and destination transport layer port, and transport layer protocol), application layer information, etc.

The process 400 identifies (at 410) remote service connection flows in the batch of flow information. The graph generation module, in some embodiments, receives all of the correlated flow attribute sets and uses the application information to identify which flow attribute sets are for remote service connection flows. In other embodiments, the graph generation module listens on a queue of all the correlated flow attribute sets (e.g., a queue also used by the anomaly detectors, etc.) to identify flows for remote service connections. These remote service connections entail one DCN accessing and controlling some aspect of another DCN and are commonly used in lateral movement attacks as the attacker moves throughout the datacenter. Examples of remote service connection protocols include secure shell protocol (SSH), remote desktop protocol (RDP), telnet, virtual network computing (VNC), and others.

For each remote service connection flow, the process 400 identifies (at 415) the source and destination DCNs, the start and end time of the flow, the transport protocol (e.g., TCP, UDP, etc.) of the flow, the remote service application, and the destination transport layer port number used for the flow. For a remote service connection flow, the source DCN is the DCN that runs the remote service application to access and control some aspect of another DCN (i.e., the destination DCN of the flow). This information is identifiable from either the flow attribute set (e.g., the transport layer protocol, the destination port) and/or any mapped contextual attribute data (e.g., the remote service application may be available from either the application layer information in the flow attribute set or the contextual attributes mapped to the flow attribute set in different embodiments).

The process 400 then adds (at 420) an edge for each flow to a graph of remote service connections using this identified data. As mentioned, in some embodiments the graph is stored as a set of such directed edges between nodes, with each directed edge representing a remote service connection in which a source DCN accesses a destination. Each time one DCN accesses another DCN, a new edge is added to the graph, such that the graph can have multiple edges between the same pair of DCNs. These multiple edges may be in the same direction or different directions (i.e., if DCN A accesses DCN B and then, at a later time, DCN B accesses DCN A), or both.

Figure 5:
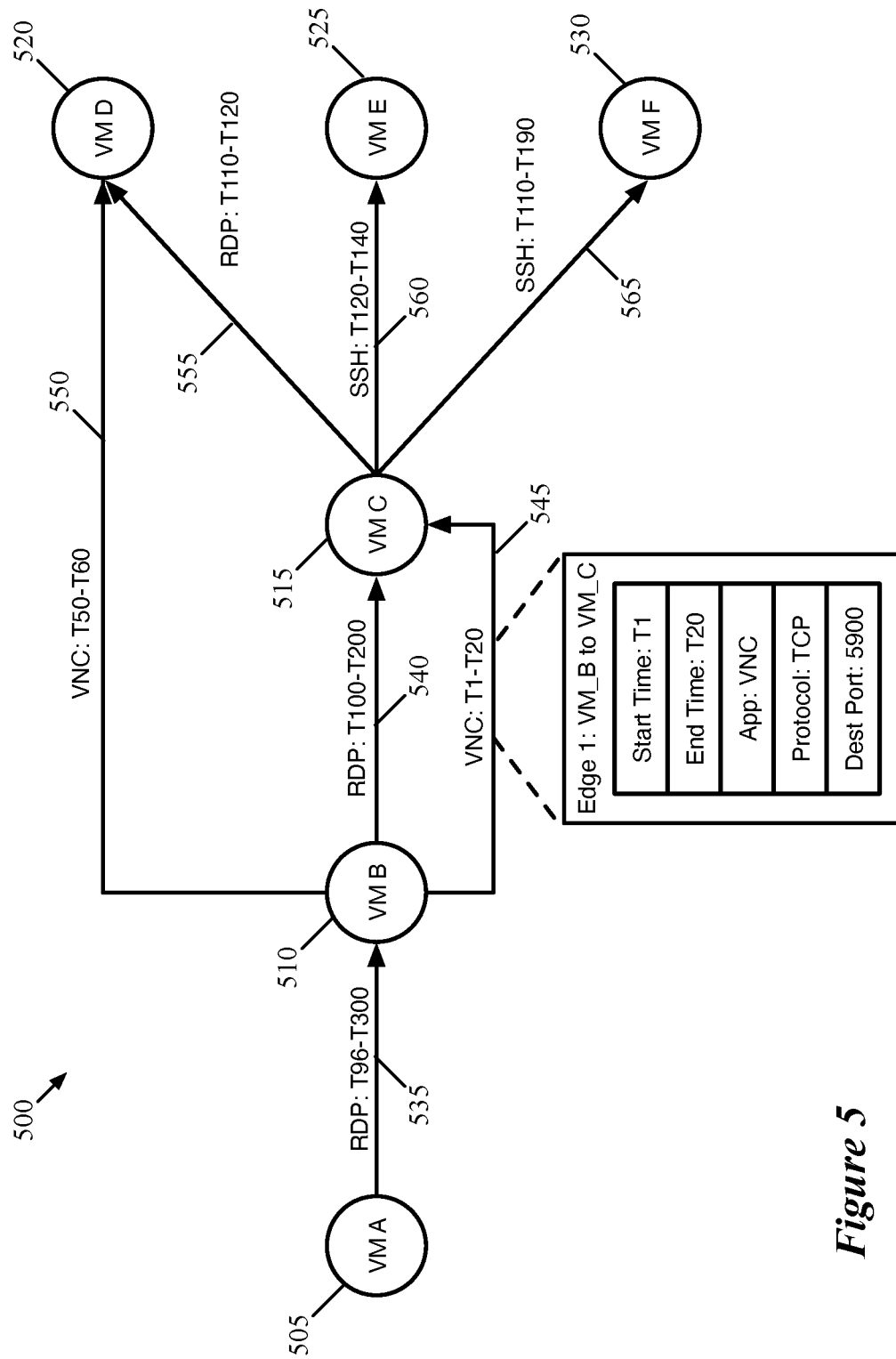
FIG. 5 conceptually illustrates a portion of a graph that includes nodes representing six DCNs.

FIG. 5 conceptually illustrates a portion of such a graph 500 that includes nodes 505-530 representing six DCNs (VMs A-F). The graph portion 500 includes seven edges 535-565 between these six nodes. Each of these is shown with a remote service protocol (e.g., RDP, SSH, VNC) as well as a start time and end time for the remote service connection. As described further below, these start and end times are used by the graph generation module to generate time-constrained sub-graphs.

In the graph portion 500, the edge 535 between nodes 505 and 510 represents an RDP connection in which VM A accesses VM B from time T96 to time T300. The edge 540 between nodes 510 and 515 represents an RDP connection in which VM B accesses VM C from time T100 to time T200, while edge 545 between these same nodes 510 and 515 represents a VNC connection in which VM B accesses VM C from time T1 to T20. VM B also accesses VM D using a VNC connection from T50-T60, represented by the edge 550 between nodes 510 and 520. VM C accesses three different VMs D, E, and F, with these connections represented by three edges: edge 555 between nodes 515 and 520 representing an RDP connection in which VM C accesses VM D from time T110 to T120, edge 560 between nodes 515 and 525 representing an SSH connection in which VM C accesses VM E from time T120 to T140, and edge 565 between nodes 515 and 530 representing an SSH connection in which VM C accesses VM F from time T110 to T190. The figure also indicates additional information that the edge 545 stores for the VNC connection. As shown, each edge stores a start time and end time (T1-T20) for the remote service connection, the remote service application used (VNC), the transport layer protocol (TCP), and the destination transport layer port (5900).

The remote service connection graph is used to generate sub-graphs for use in detecting lateral movement attacks, in some embodiments. As noted, these attacks often involve an attacker gaining access to a first DCN and using that access to subsequently gain access to a number of other DCNs (through a series of remote service connections) until a target DCN is reached and the ultimate goal of the attack can be carried out. Time-constrained sub-graphs of the remote service connection graph can, in some cases, identify such a series of remote service connections.

Figure 6:
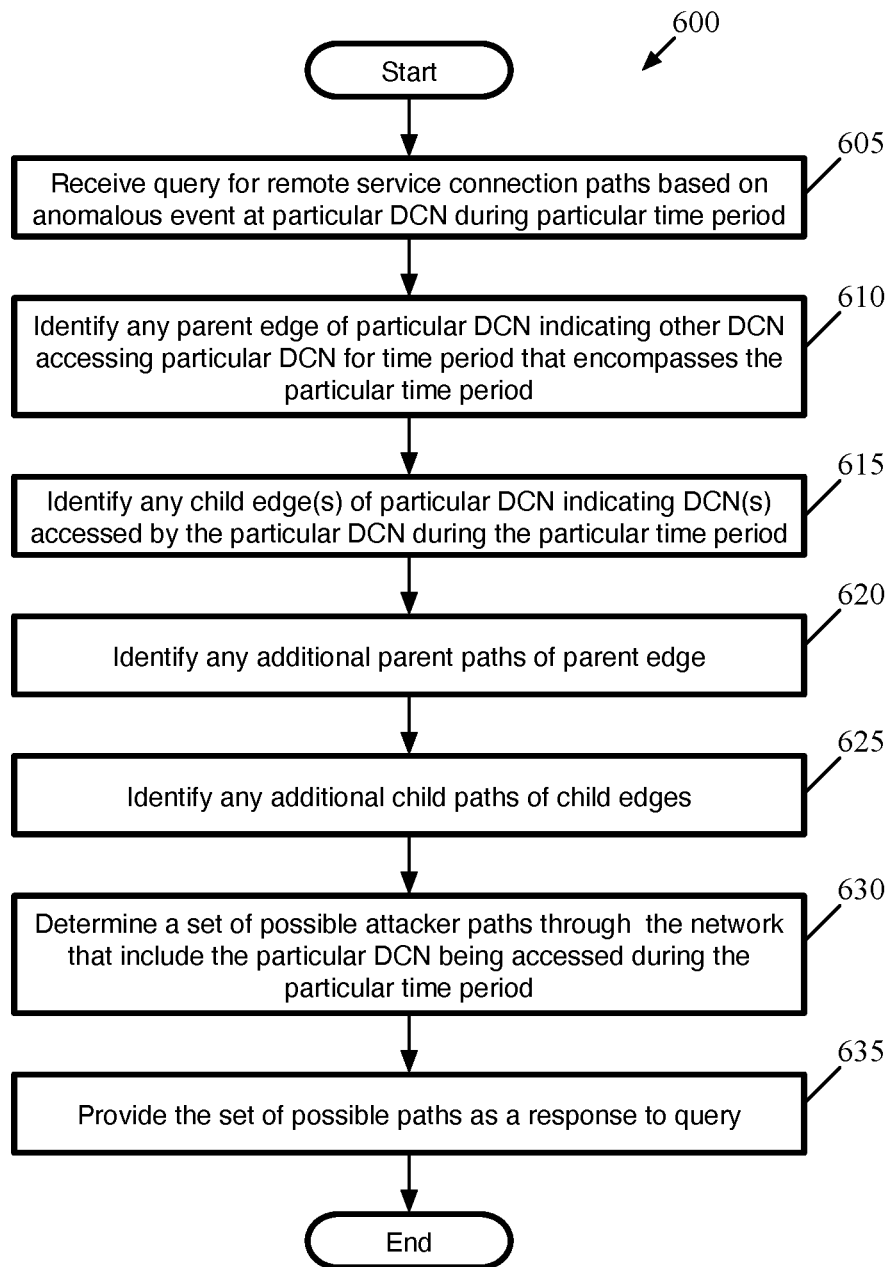
FIG. 6 conceptually illustrates a process of some embodiments for providing paths of time-ordered remote service connections based on a particular anomalous event.

FIG. 6 conceptually illustrates a process 600 of some embodiments for providing paths of time-ordered remote service connections (i.e., sub-graphs) based on a particular anomalous event. In some embodiments, this process 600 is performed by a graph generation module of an analysis appliance such as that described above (e.g., by the time-constrained sub-graph generator 365). Whereas the graph generation module regularly maintains the remote service connection graph as the analysis appliance receives and correlates information about new flows, the sub-graphs are only generated based on requests (e.g., from the lateral movement threat detector) in some embodiments.

As shown, the process 600 begins by receiving (at 605) a query for remote service connection paths based on an anomalous event that took place at a particular DCN during a particular time period. In some embodiments, as described above, the lateral movement threat detector sends a query with this information (i.e., the time period and the DCN, as the other details of the event are not important for the generation of the sub-graphs) to the graph generation module.

The graph generation module (or a separate module, in some embodiments) accesses the remote service connection graph to identify paths of remote service connections through the DCNs of the datacenter that could represent a lateral movement attack encompassing the time period of the anomalous event. Each of these paths (sub-graphs), in some embodiments, is represented by a set of nodes of the remote service connection graph connected by an ordered set of edges. The set of nodes includes the node representing the DCN associated with the particular anomalous event.

In this discussion, each node other than the initial node in the path (i.e., the node representing the VM that is not accessed by remote service connections from any other VMs in the path) has a parent edge and each node other than the last node in the path has a child edge. A parent edge for a given node is the edge representing the connection used to access the DCN represented by that node, while a child edge for a given node is the edge representing the connection by which the DCN represented by the node accesses the next DCN in the path. Correspondingly, each edge in the path has a parent node (representing the DCN that initiates the connection represented by that edge) and a child node (representing the DCN accessed by the parent node of that edge).

Figure 7:
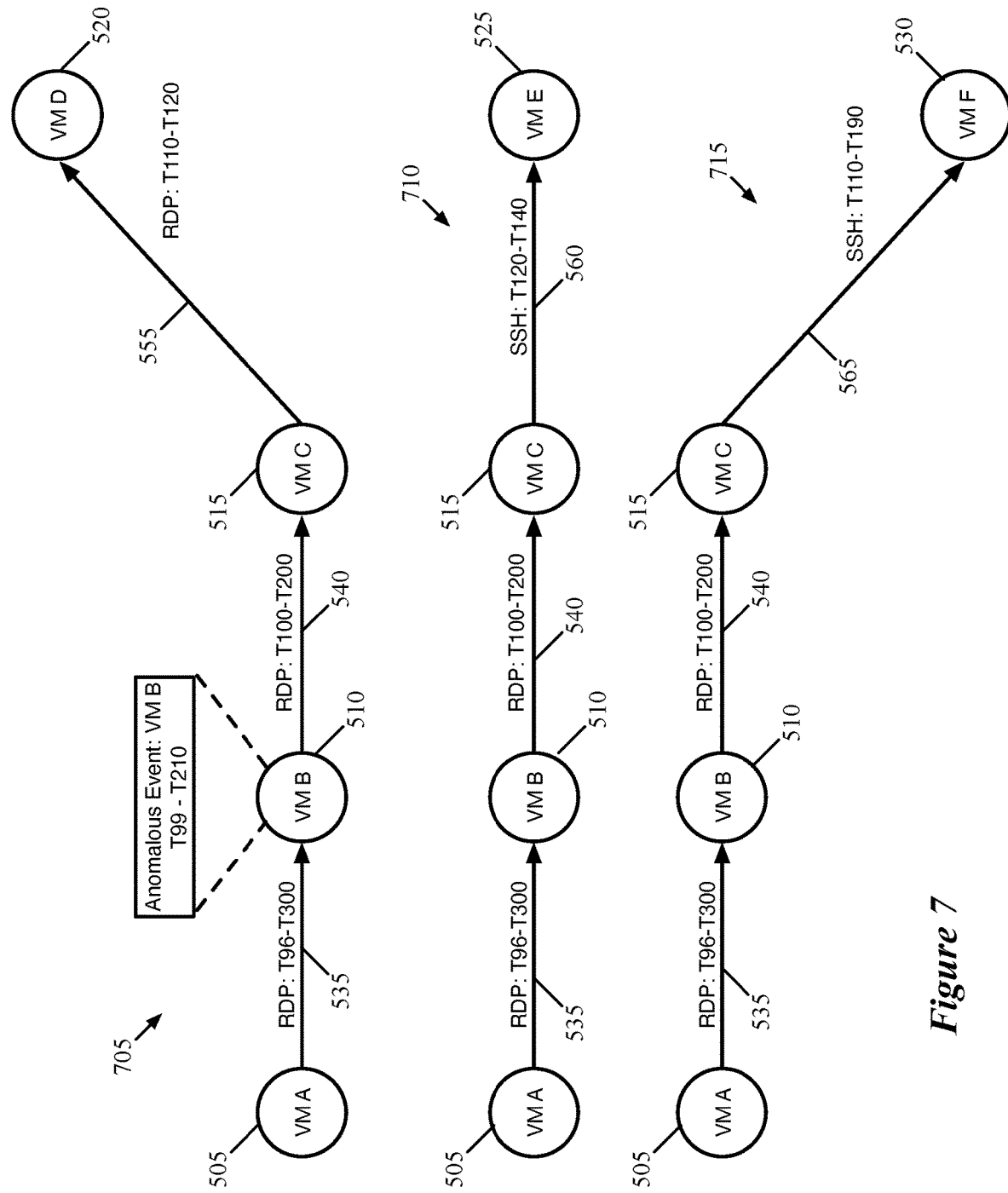
FIG. 7 conceptually illustrates three sub-graphs representing paths through the graph of FIG. 5 that would be identified as sub-graphs based on an anomalous event occurring at one of the DCNs.

To generate the set of paths, some embodiments identify (at 610) any parent edge of the particular DCN (i.e., the DCN on which the query is based) indicating another DCN accessing that particular DCN for a time period that encompasses the particular time period. FIG. 7 conceptually illustrates three sub-graphs 705-715 representing paths through the graph 500 of FIG. 5 that would be identified as sub-graphs based on an anomalous event occurring at VM B during the time period T99 to T210, and will be used to explain the operations of process 600. In this case, the anomalous event took place at VM B, which is represented by node 510. As noted, any parent edge of this node 510 would need to represent a remote service connection accessing the VM, as is the case with edge 535. In addition, the connection represented by edge 535 occurs from T96 to T300, and therefore encompasses the entirety of the anomalous event time period. As such, 535 is a parent edge of the node 510 for this possible set of paths. A given node will typically have only one parent edge, because it is typically difficult or impossible for multiple different DCNs to access the same DCN at the same time.

The process 600 also identifies (at 615) any child edge(s) of the particular DCN (i.e., the DCN on which the query is based) indicating DCN(s) accessed by the particular DCN during the particular time period. It should be noted that the process 600 is a conceptual process and the operations described might not be performed in the order shown. For instance, the identification of child and parent edges can occur in different orders in different embodiments (and might occur at the same time in some cases). Whereas a node will typically only have one parent edge for a specified time period, the node can have multiple child edges (leading to different paths) when a user of a DCN opens multiple remote service connections with various different DCNs during a specified time period (or opens and closes multiple such connections with the same destination DCN during the specified time period.

The specific timing requirements on child edges can vary in different embodiments. Some embodiments require the remote service connection to be completed during the particular time period of the triggering anomalous event, while other embodiments only require the connection to begin during the particular time period (i.e., the connection can close afterward). Yet other embodiments base the requirement for a child node on the time period of the connection represented by the parent edge (so long as such an edge is present), only requiring that the connection represented by a potential child edge be completed (or just begin) during the parent edge connection (i.e., while a potential attacker is logged into that DCN).

In the graph portion 500, the node 510 representing VM B only has one child edge that fits the requirements. The RDP connection to VM C represented by edge 540 occurs from time T100 to T200, and is thus within the time period T96 to T210 of the anomalous event that occurred at VM B. The other remote service connections originating from VM B took place at earlier times (T1-T20 for the connection to VM D represented by edge 545 and T50-T60 for the other connection to VM C represented by edge 550) and therefore do not meet the criteria to be child edges of the particular node 510.

Returning to FIG. 6, the process 600 identifies (at 620) any additional parent paths of the identified parent edge (if a parent edge was identified) and (at 625) any additional child paths of any child edges. Similar time constraints apply to these additional parent and child paths. That is, the parent edge of the particular node has an associated parent node and time period (the time period of the remote service connection represented by that parent edge). The process determines whether there are any parent edges for this parent node, representing remote service connections that access the DCN represented by that parent node for a time period encompassing the time period of the previously identified remote service connection. In the example of graph portion 500, there are no remote service connections that access VM A and thus there are no further parent paths. However, the parent path can be extended out for as many edges as there are valid parent edges.

Similarly, any child edges of the particular node have child nodes, and each of these child nodes can in turn have one or more valid child edges. As with the initial child edge of the particular node, the child edges of a given child node represent remote service connections initiated by the DCN represented by the child node and that occur during the time period that the child node is itself being accessed by the remote service connection represented by its parent edge. Each subsequent child edge has a child node, which in turn can have zero or more child edges. In addition, any time that a node has multiple valid child edges, each of these child edges represents a separate path of connections. Thus, if a child node has three child edges, the child nodes of which each have three child edges, then there would be nine separate paths through the network.

In the example shown in FIGS. 5 and 7, the child node 515 has three child edges that meet the criteria. The edge 555 represents VM C accessing VM D from time T110 to T120, the edge 560 represents VM C accessing VM E from time T120 to T140, and the edge 565 represents VM C accessing VM F from time T110 to T190. All of these time periods are encompassed by the time T100 to T200 and are thus all valid child edges.

The process 600 uses these parent and child edges/paths to determine (at 630) a set of possible attacker paths through the network that each include the particular DCN being accessed during the particular time period. The process provides (at 635) this set of possible paths as a response to the query (i.e., to the lateral movement threat detector). As described in detail below, the threat detector analyzes these paths to assess the likelihood that they represent a lateral movement attack on the datacenter. In the example shown in FIG. 7, the graph portion 500 includes three different paths 705-715. Each of these three paths includes edges 535 and 540 (i.e., representing VM A accessing VM B via RDP connection and VM B accessing VM C via RDP connection). In addition, the path 705 includes edge 555, the path 710 includes edge 560, and the path 715 includes edge 565. That is, in the three paths, VM C accesses three different DCNs (VMs D, E, and F respectively).

The lateral movement threat detector uses these paths of remote service connections returned by the graph generation module to assess the likelihood that the datacenter network has been attacked by a lateral movement threat. To do so, the lateral movement threat detector analyzes other anomalous events detected by the various detectors of the analysis appliance to determine whether any of these anomalous events occurred at DCNs along the path at the relevant times. The threat detector then analyzes the remote service connections in a path and these identified anomalous events along the path to determine the likelihood of a lateral movement attack.

Figure 8:
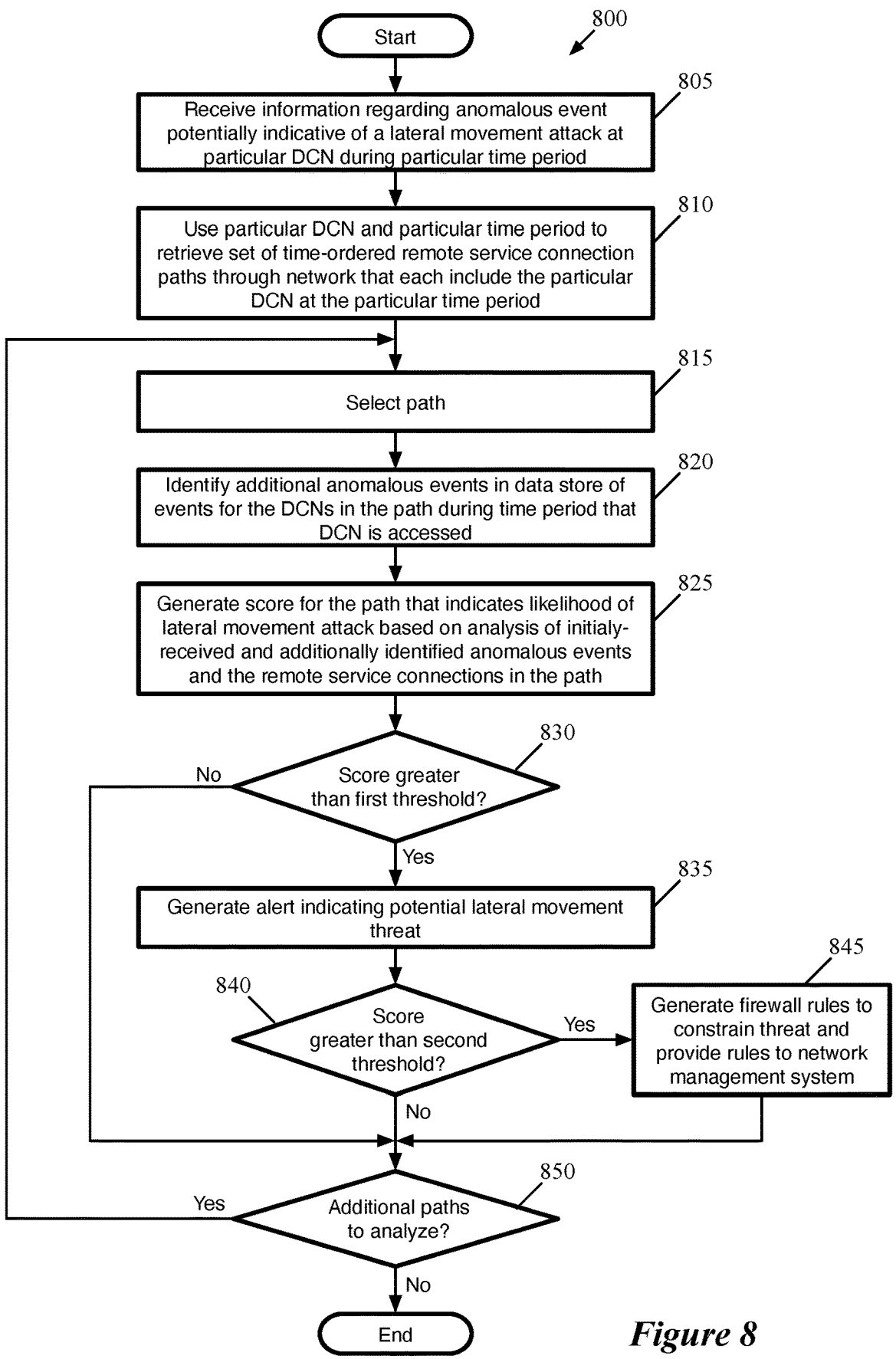
FIG. 8 conceptually illustrates a process of some embodiments for determining whether any set of remote service connections is indicative of a lateral movement attack.

FIG. 8 conceptually illustrates a process 800 of some embodiments for determining whether any set of remote service connections is indicative of a lateral movement attack. The process 800 is performed by a lateral movement threat detector in some embodiments (e.g., the threat detector 150 described above). This process 800 will be described in part by reference to FIGS. 9 and 10, which illustrate different examples of ordered sets of remote service connections that may or may not represent lateral movement attacks.

As shown, the process 800 begins by receiving (at 805) information regarding an anomalous event that is potentially indicative of a lateral movement attack at a particular DCN during a particular period. As described, the analysis appliance of some embodiments includes a number of different event detectors (both real-time and batch processing detectors) that analyze the flow information, context information, and/or configuration information provided to the analysis appliance and detect various types of anomalous events. In some embodiments, at least a subset of these anomalous events (e.g., particular types of events that tend to be more indicative of lateral movement attacks) are provided to the lateral movement threat detector. For instance, in some embodiments certain detectors add all (or a subset) of their detected anomalies to a queue of anomalous events that is provided to the lateral movement threat detector. Some or all of these events then precipitate further analysis by the lateral movement threat detector.

The process 800 uses (at 810) the particular DCN and the particular time period to retrieve a set of time-ordered remote service connection paths through the network that each include the particular DCN at the particular time period. As described by reference to FIG. 6, the lateral movement threat detector queries the graph generation module in some embodiments, which identifies a set of sub-graphs (representing the set of time-ordered remote service connection paths) and returns the set of sub-graphs to the lateral movement threat detector. Each of these paths specifies a set of remote service connections between a set of DCNs, with each connection having an associated time period (i.e., a time period during which a potential attacker was logged into the DCN represented by the child node of the edge representing the connection). The threat detector then, in some embodiments, analyzes each of these paths to determine whether the path is likely indicative of a lateral movement attack.

The process 800 next selects (at 815) a path from the retrieved set of paths. It should be understood that the process 800 is a conceptual process and that the operations described might not be performed in the order shown. For instance, rather than analyzing each path separately in a serial manner, some embodiments analyze all of the paths in parallel while making use of the overlaps between paths (e.g., the overlaps between the edges of paths 705-715).

For the selected path, the process 800 identifies (at 820) additional anomalous events in the data store of events for the DCNs in the path during the time that the DCN is accessed. For each DCN along the path, the lateral movement threat detector of some embodiments queries the anomalous events data store for events that (i) are associated with the DCN and (ii) occur during the relevant time that the DCN is accessed. Some embodiments require that an event occurs entirely during the time period when the previous DCN in the path was logged into the DCN at which the event occurred (i.e., the start time and end time of the event are completely encompassed by the start time and end time of the remote service connection accessing that DCN). Other embodiments only require that the event start during (or within a specific amount of time after the end of) that login period, in case some anomalies continue after the user has logged out of the DCN. In some embodiments, the relevant time in relation to the login time period is different for different types of events (i.e., a first type of anomalous event requires only that the event start during the login period to be considered relevant while a second type of anomalous event requires that the event start and end during the login period). In addition, some embodiments look for events relating to the remote service connections themselves. Specifically, in some embodiments one of the anomalous event detectors reviews flows to identify suspicious connections. Remote service connections when the source DCN has not previously accessed the destination DCN may be identified as suspicious connections in some embodiments.

Figure 9:
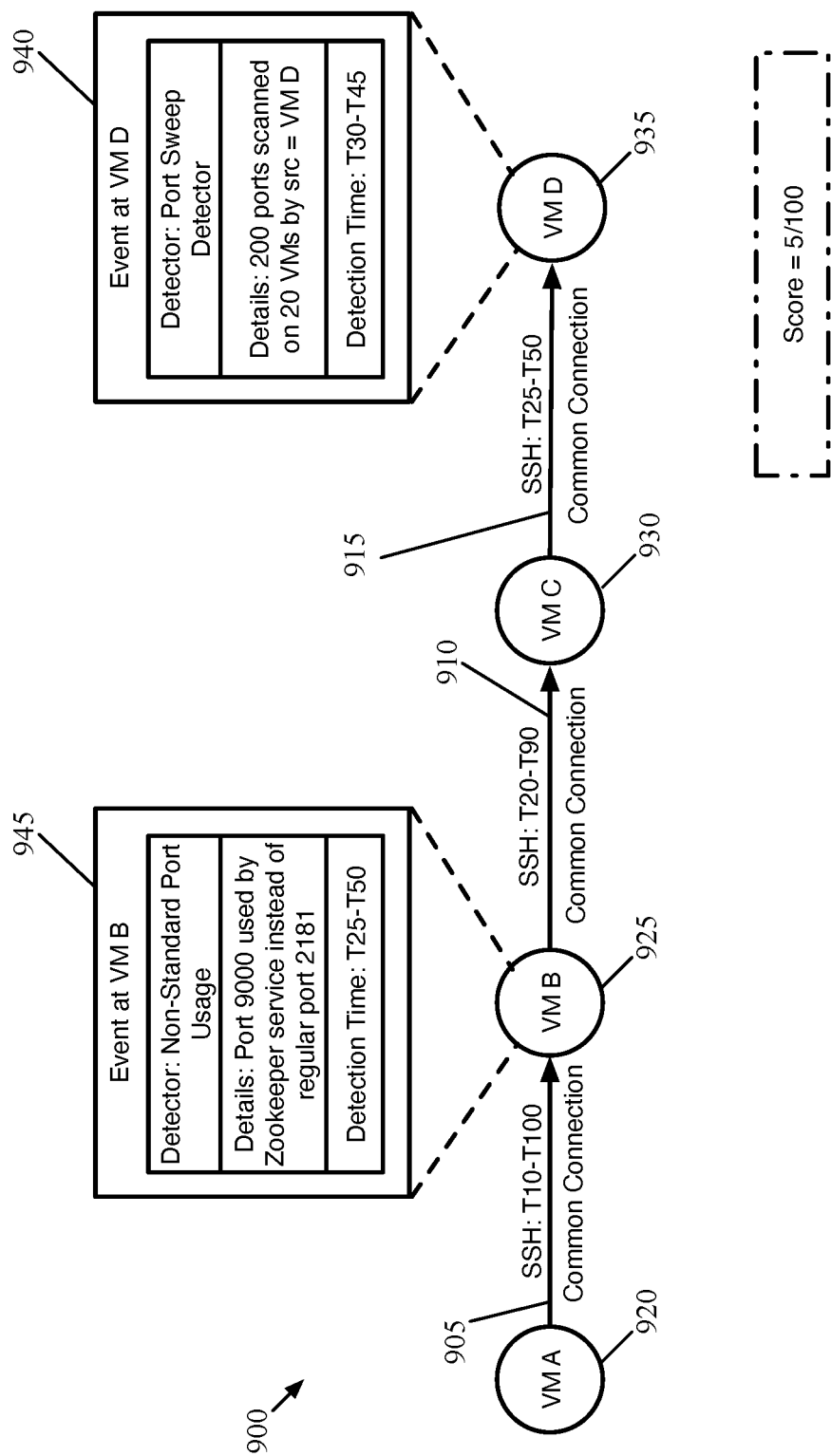
FIGS. 9 and 10 illustrate different examples of ordered sets of remote service connections that may or may not represent lateral movement attacks.
Figure 10:
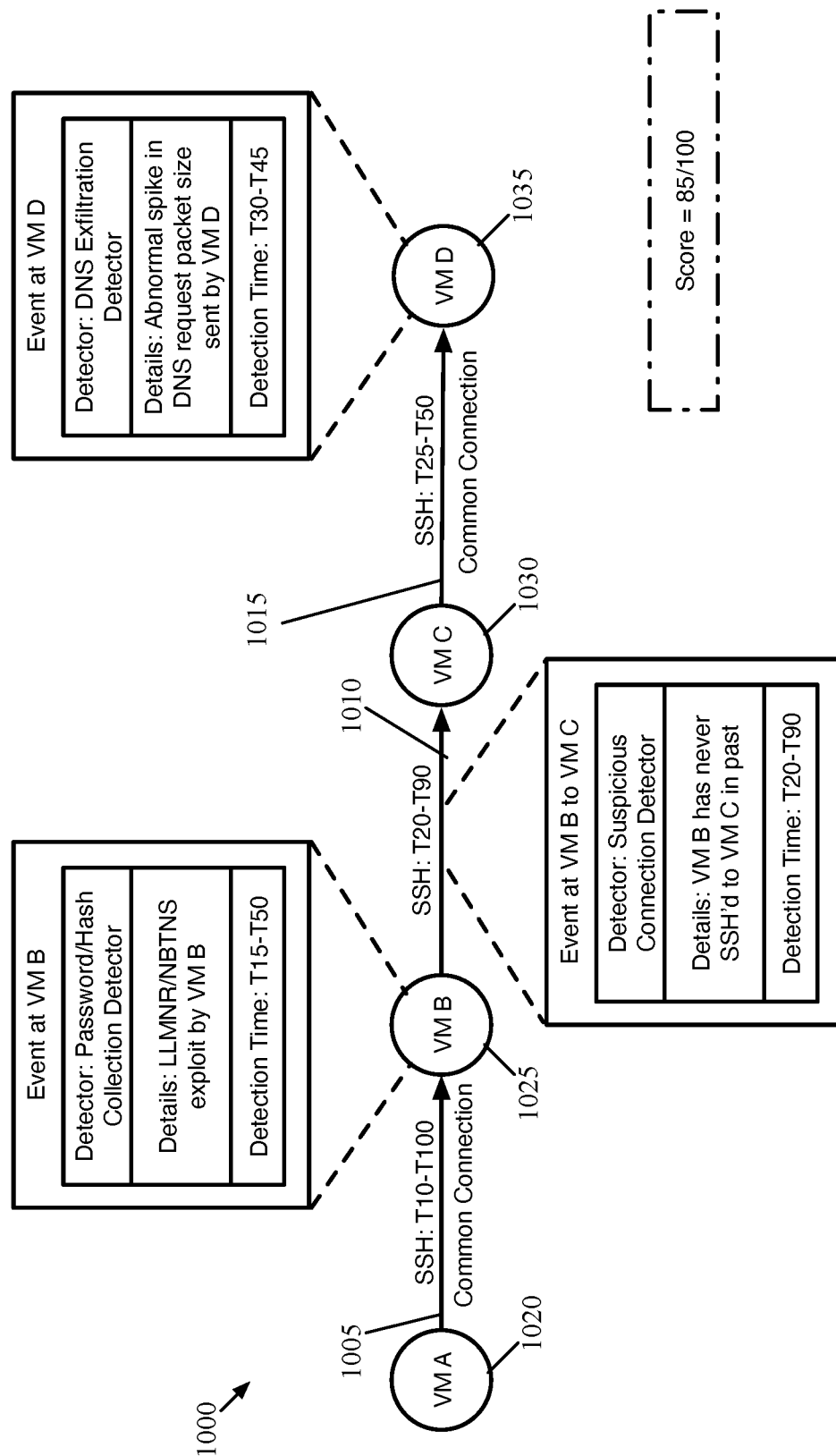

As mentioned, FIGS. 9 and 10 conceptually illustrate examples of remote service connection paths and the analysis of these paths. FIG. 9 shows a path 900 with three remote service connections (represented as graph edges 905-915) between four VMs (represented as nodes 920-935). In addition, two anomalous events that meet the criteria of occurring at the VMs during the relevant time period are shown. The precipitating anomalous event in this case (i.e., that caused the lateral movement threat detector to query the graph generation module) occurred at VM D. This event is a port sweep event and the record 940 stored for the event identifies (i) the detector, which also serves as an identifier of the event type, (ii) the details, which indicate that VM D scanned 200 ports on 20 VMs, and (iii) the time period of the event, T30-T45. Based on the sub-graph returned by the graph generation module, the lateral movement threat detector also identified a record 945 for a second event. This second event is a non-standard port usage event at VM B, with port 9000 being used by the Zookeeper service rather than the standard Zookeeper port 2181.

FIG. 10 shows a path 1000 that also includes three remote service connections (represented as graph edges 1005-1015) between four VMs (represented as nodes 1020-1035). Here, three anomalous events (including one suspicious connection) that meet the criteria of occurring at the VMs during the relevant time period are shown. The precipitating event in this case is a password/hash collection event at VM B from time T15-T50, in which Link-Local Multicast Name Resolution (LLMNR) and NetBIOS Name Service (NBT-NS) are exploited by VM B. Such an event is often associated with a lateral movement attack. In addition, the remote service connection in which VM B uses SSH to access VM C is detected as a suspicious connection event because VM B had not previously used SSH to access VM C. Finally, the DNS exfiltration detector detected an abnormal spike in the DNS request packet size sent by VM D during the relevant time period.

Returning to FIG. 8, the process 800 then generates (at 825) a score for the selected path that indicates the likelihood that the path indicates a lateral movement attack based on analysis of the anomalous events (i.e., the initially received event and the additional identified events) and the remote service connections in the path. In different embodiments, the threat detector accounts for different indicators to determine whether the path is indicative of a lateral movement attack. For instance, suspicious connection events such as that shown in FIG. 10 are often indicative of such an attack. Some embodiments also analyze each connection to determine how often the source DCN for the connection accesses the destination DCN using the particular remote service application.

Some embodiments also analyze the various anomalous events to determine whether these events are of the sort that are typical in a lateral movement attack. For instance, a password/hash collection event would be indicative of a lateral movement attack, as this sort of password collection is often used to illicitly gain access to the next DCN in the path. A non-standard port usage event, while potentially suspicious, is not as likely to be indicative of such an attack. In addition, some embodiments factor in the extent to which the various anomalous events identified along a path are correlated.

As examples, the non-standard port usage event shown in FIG. 9 at VM B does not appear to have any correlation to the port sweep event detected at VM D. On the other hand, in FIG. 10, the password/hash collection event at VM B followed shortly by the suspicious connection from VM B to VM C and the spike in DNS request packet size at VM D, are far more likely to indicate a lateral movement attack.

The lateral movement threat detector accounts for these various factors (e.g., type of anomalous events, whether the connections are usual, correlation of anomalous events) and assigns a score indicative of the likelihood that a lateral movement attack is present. Some embodiments use an algorithm that adds to a base score for each event (e.g., adding different amounts for different types of events) as well as for pre-defined correlations between specific types of events. In addition, some embodiments normalize these scores (e.g., to a scale of 1, 10, 50, 100, etc.) The path 900 in FIG. 9 has very little correlation between events that are not all that indicative of a lateral movement attack and therefore is assigned a low score of 5, whereas the path 1000 in FIG. 10 has a high level of correlation between events that are indicative of a lateral movement attack and therefore is assigned a score of 85.

Based on the score, the lateral movement attack detector can determine whether any remediation is necessary. The process 800 determines (at 830) whether the score is greater than a first threshold. If the score is above this first threshold, then the process generates (at 835) an alert to indicate the potential lateral movement threat. This alert may be stored in an alerts data store and is presented to the network administrator. This allows the network administrator to review these possible threats and potentially dismiss the threat (thereby providing feedback to the lateral movement threat detector), further examine the threat, or configure policy to handle the threat (e.g., by configuring firewall rules).

In addition, if the score is greater than the first threshold, the process 800 determines (at 840) whether the score is also greater than a second, higher threshold. If the score is lower than the first threshold, then there is no need to check the second threshold because the score will obviously also be lower than this second threshold.

If the score is greater than the second threshold, the process 800 generates (at 845) firewall rules designed to constrain the threat and provides these rules to the network management system. This enables the network management system to configure one or more network elements (e.g., host computers that implement distributed firewalls, edge gateway firewalls, third-party firewalls, etc.) to implement these firewall rules. The firewall rules may constrain one or more of the DCNs along the path of remote service connections (e.g., the initial DCN in the path that was accessed to start the series of remote service connections, the last-accessed DCN at the end of the path, all of the DCNs in the path) by limiting or completely preventing these DCNs to send and/or receive any data traffic in some embodiments.

Finally, the process 800 determines (at 850) whether there are any additional paths remaining to analyze. If multiple paths were returned by the graph generation module, then the lateral movement threat detector analyzes each of them in some embodiments. In some cases, multiple paths might be indicative of a lateral movement attack, especially if there is significant overlap in the paths. This might be the result of a single attack, in which the attacker was able to access numerous VMs from a single VM once gaining access to that single VM. Once all of the paths have been analyzed and any remediation measures handled, the process 800 ends.

Figure 11:
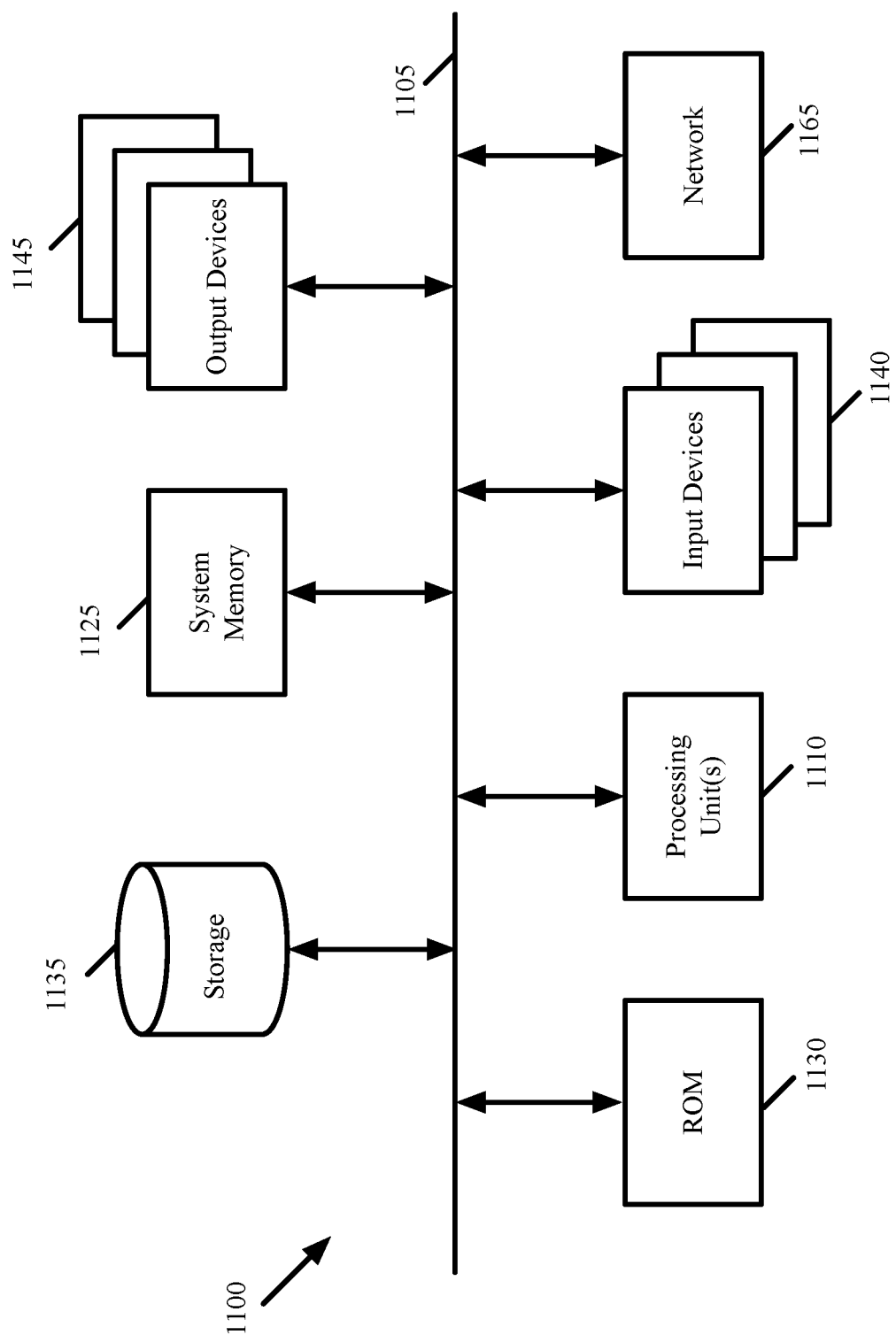
FIG. 11 conceptually illustrates an electronic system with which some embodiments of the invention are implemented.

FIG. 11 conceptually illustrates an electronic system 1100 with which some embodiments of the invention are implemented. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1125, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory (ROM) 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1125 is a read-and-write memory device. However, unlike storage device 1135, the system memory is a volatile read-and-write memory, such a random-access memory. The system memory stores some of the instructions and data that the processor needs at runtime. In some embodiments, the invention's processes are stored in the system memory 1125, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1165 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 6, and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for detecting a threat to a datacenter, the method comprising:
   receiving a set of connections between a set of DCNs in the datacenter over a particular time period, the set of DCNs including at least a first DCN at which a first anomalous event was detected;
   analyzing a set of detected anomalous events to identify additional anomalous events detected at other DCNs in the set of DCNs during the particular time period; and
   based on the first anomalous event and identified additional anomalous events, determining whether the anomalous events indicate a threat to the datacenter using at least a graph of a time-constrained set of remote service connections.

2. The method of claim 1, wherein the threat is a lateral movement threat in which an attacker accesses an initial DCN and moves between the DCNs of the set of DCNs in the datacenter.

3. The method of claim 2, wherein the attacker uses remote service connections to move between the DCNs, wherein the set of connections comprises remote service connections.

4. The method of claim 1, wherein determining whether the anomalous events indicate a threat to the datacenter comprises determining whether the first anomalous event is related to the additional anomalous events.

5. The method of claim 1, wherein determining whether the anomalous events indicate a threat to the datacenter comprises analyzing previous data to determine whether connections similar to the connections between the set of DCNs have occurred previously.

6. The method of claim 1, wherein determining whether the anomalous events indicate a threat to the datacenter comprises determining whether any of the events is of a particular type often occurring during a lateral movement threat.

7. The method of claim 1 further comprising generating an alert for presentation to a network administrator when the anomalous events indicate a threat to the datacenter.

8. The method of claim 1 further comprising:
   automatically generating a set of firewall rules when the anomalous events indicate a threat to the datacenter; and
   configuring a plurality of network elements in the datacenter to implement the automatically generated firewall rules.

9. The method of claim 1, wherein the method is performed by a threat detector of an analysis appliance that receives and analyzes a plurality of flow attribute sets from a plurality of host computers in the datacenter.

10. The method of claim 9, wherein the set of detected anomalous events comprises a plurality of different types of anomalous events detected by a plurality of different detectors of the analysis appliance.

11. The method of claim 9, wherein the analysis appliance also receives contextual attribute sets from the host computers and maps the contextual attribute sets to the flow attribute sets, wherein a plurality of different detectors also use the contextual attribute sets to detect the anomalous events.

12. A non-transitory machine-readable medium storing a program which when executed by at least one processing unit detects a threat to a datacenter, the program comprising sets of instructions for:
   receiving a set of connections between a set of DCNs in the datacenter over a particular time period, the set of DCNs including at least a first DCN at which a first anomalous event was detected;
   analyzing a set of detected anomalous events to identify additional anomalous events detected at other DCNs in the set of DCNs during the particular time period; and
   based on the first anomalous event and identified additional anomalous events, determining whether the anomalous events indicate a threat to the datacenter using at least a graph of a time-constrained set of remote service connections.

13. The non-transitory machine-readable medium of claim 12, wherein the threat is a lateral movement threat in which an attacker accesses an initial DCN and uses remote service connections to move between the DCNs of the set of DCNs in the datacenter, wherein the set of connections comprises remote service connections.

14. The non-transitory machine-readable medium of claim 12, wherein the set of instructions for determining whether the anomalous events indicate a threat to the datacenter comprises a set of instructions for determining whether the first anomalous event is related to the additional anomalous events.

15. The non-transitory machine-readable medium of claim 12, wherein the set of instructions for determining whether the anomalous events indicate a threat to the datacenter comprises a set of instructions for analyzing previous data to determine whether connections similar to the connections between the set of DCNs have occurred previously.

16. The non-transitory machine-readable medium of claim 12, wherein the set of instructions for determining whether the anomalous events indicate a threat to the datacenter comprises a set of instructions for determining whether any of the events is of a particular type often occurring during a lateral movement threat.

17. The non-transitory machine-readable medium of claim 12, wherein the program further comprises a set of instructions for generating an alert for presentation to a network administrator when the anomalous events indicate a threat to the datacenter.

18. The non-transitory machine-readable medium of claim 12, wherein the program further comprises sets of instructions for:
   automatically generating a set of firewall rules when the anomalous events indicate a threat to the datacenter; and
   configuring a plurality of network elements in the datacenter to implement the automatically generated firewall rules.

19. The non-transitory machine-readable medium of claim 12, wherein:
   the program is a threat detector module of an analysis appliance that receives and analyzes a plurality of flow attribute sets from a plurality of host computers in the datacenter; and
   the set of detected anomalous events comprises a plurality of different types of anomalous events detected by a plurality of different detectors of the analysis appliance.

20. An electronic device comprising:
   a set of processing units; and
   a non-transitory machine-readable medium storing a program which when executed by at least one processing unit detects a threat to a datacenter, the program comprising sets of instructions for:
   receiving a set of connections between a set of DCNs in the datacenter over a p articular time period, the set of DCNs including at least a first DCN at which a first anomalous event was detected;

analyzing a set of detected anomalous events to identify additional anomalous events detected at other DCNs in the set of DCNs during the p articular time period; and based on the first anomalous event and identified additional anomalous events, determining whether the anomalous events indicate a threat to the datacenter using at least a graph of a time-constrained set of remote service connections.

* * * * *